(12) United States Patent
Henry et al.

(10) Patent No.: US 7,755,790 B2
(45) Date of Patent: Jul. 13, 2010

(54) METHOD AND SYSTEM FOR TRANSFERRING SPONSORED DIGITIZED REPRESENTATIONS OF DOCUMENTS VIA COMPUTER NETWORK TRANSFER PROTOCOLS

(75) Inventors: Matthew K. Henry, San Francisco, CA (US); Christopher L. Fortescue, San Francisco, CA (US)

(73) Assignee: MongoNet, San Francisco, CA (US)

( * ) Notice: Subject to any disclaimer, the term of this patent is extended or adjusted under 35 U.S.C. 154(b) by 934 days.

(21) Appl. No.: 11/357,739

(22) Filed: Feb. 16, 2006

(65) Prior Publication Data

US 2007/0002388 A1     Jan. 4, 2007

Related U.S. Application Data

(63) Continuation-in-part of application No. 10/160,445, filed on May 28, 2002, now Pat. No. 7,079,275, and a continuation-in-part of application No. 09/537,820, filed on Mar. 28, 2000, now Pat. No. 6,424,426.

(60) Provisional application No. 60/654,244, filed on Feb. 17, 2005, provisional application No. 60/756,749, filed on Jan. 6, 2006.

(51) Int. Cl.
*G06F 3/12* (2006.01)

(52) U.S. Cl. ............... 358/1.15; 358/402; 358/434; 358/440; 358/448

(58) Field of Classification Search ......... 358/1.15, 358/402, 434, 440, 448
See application file for complete search history.

(56) References Cited

U.S. PATENT DOCUMENTS 4,106,060 A     8/1978   Chapman, Jr.

(Continued)

FOREIGN PATENT DOCUMENTS

EP          0 465 011           1/1992

(Continued)

OTHER PUBLICATIONS

Emert, "Web Ad Spending Passes Outdoor Medium," San Francisco, Chronicle, May 4, 1999.

(Continued)

*Primary Examiner*—Twyler L Haskins
*Assistant Examiner*—Michael Burleson
(74) *Attorney, Agent, or Firm*—Townsend and Townsend and Crew LLP

(57) ABSTRACT

A method for a computer system includes receiving a facsimile transmission from a user, wherein the facsimile transmission includes a digitized representation of a document transmitted using a facsimile transmission format, processing the digitized representation of the document to determine a destination e-mail address, reformatting at least a portion of the digitized representation of the document into an e-mail attachment format, determining advertisement data associated with the facsimile transmission, and forming an e-mail message addressed to the destination e-mail address, wherein the e-mail message includes a body portion and an attachment portion, wherein the body portion includes the advertisement data, and wherein the attachment portion includes the portion of the digitized representation of the document in the e-mail attachment format.

35 Claims, 16 Drawing Sheets

U.S. PATENT DOCUMENTS

| | | | |
|---|---|---|---|
| 4,207,598 A | 6/1980 | Reich et al. | |
| 4,566,127 A | 1/1986 | Sekiya et al. | |
| 4,724,309 A | 2/1988 | Greene | |
| 4,748,317 A | 5/1988 | Satoh | |
| 4,757,348 A | 7/1988 | Rourke et al. | |
| 4,893,333 A | 1/1990 | Baran et al. | |
| 4,994,926 A | 2/1991 | Gordon et al. | |
| 5,115,326 A | 5/1992 | Burgess et al. | |
| 5,175,684 A | 12/1992 | Chong | |
| 5,193,110 A | 3/1993 | Jones et al. | |
| 5,227,893 A | 7/1993 | Ett | |
| 5,247,591 A | 9/1993 | Baran | |
| 5,287,199 A | 2/1994 | Zoccolillo | |
| 5,291,302 A | 3/1994 | Gordon et al. | |
| 5,339,156 A | 8/1994 | Ishii | |
| 5,386,297 A | 1/1995 | Tanaka et al. | |
| 5,404,231 A | 4/1995 | Bloomfield | |
| 5,416,602 A | 5/1995 | Inga et al. | |
| 5,459,584 A | 10/1995 | Gordon et al. | |
| 5,461,488 A | 10/1995 | Witek | |
| 5,465,167 A | 11/1995 | Cooper et al. | |
| 5,497,319 A | 3/1996 | Chong et al. | |
| 5,513,254 A * | 4/1996 | Markowitz | 379/100.17 |
| 5,515,176 A | 5/1996 | Galen et al. | |
| 5,555,100 A | 9/1996 | Bloomfield et al. | |
| 5,559,611 A | 9/1996 | Bloomfield et al. | |
| 5,675,507 A | 10/1997 | Bobo, II | |
| 5,767,985 A | 6/1998 | Yamamoto et al. | |
| 5,790,639 A | 8/1998 | Ranalli et al. | |
| 5,832,100 A | 11/1998 | Lawton et al. | |
| 5,841,550 A | 11/1998 | Johnson | |
| 5,848,413 A | 12/1998 | Wolff | |
| 5,861,958 A | 1/1999 | Jamrog | |
| 5,870,549 A | 2/1999 | Bobo, II | |
| 5,872,926 A | 2/1999 | Levac et al. | |
| 5,873,077 A | 2/1999 | Kanoh et al. | |
| 5,881,233 A | 3/1999 | Toyoda et al. | |
| 5,893,908 A | 4/1999 | Cullen et al. | |
| 5,926,565 A | 7/1999 | Froessl | |
| 6,009,150 A | 12/1999 | Kamel | |
| 6,014,502 A | 1/2000 | Moraes | |
| 6,020,980 A | 2/2000 | Freeman | |
| 6,023,345 A | 2/2000 | Bloomfield | |
| 6,025,931 A * | 2/2000 | Bloomfield | 358/402 |
| 6,061,502 A | 5/2000 | Ho et al. | |
| 6,073,165 A | 6/2000 | Narasimhan et al. | |
| 6,101,244 A | 8/2000 | Okada | |
| 6,102,958 A | 8/2000 | Meystel et al. | |
| 6,104,500 A | 8/2000 | Alam et al. | |
| 6,124,939 A | 9/2000 | Toyoda et al. | |
| 6,157,464 A | 12/2000 | Bloomfield et al. | |
| 6,157,706 A | 12/2000 | Rachelson | |
| 6,208,638 B1 | 3/2001 | Rieley et al. | |
| 6,266,160 B1 | 7/2001 | Saito et al. | |
| 6,285,777 B2 | 9/2001 | Kanevsky et al. | |
| 6,350,066 B1 | 2/2002 | Bobo, II | |
| 6,356,356 B1 | 3/2002 | Miller et al. | |
| 6,374,246 B1 | 4/2002 | Matsuo | |
| 6,424,426 B1 | 7/2002 | Henry | |
| 6,549,612 B2 | 4/2003 | Gifford et al. | |
| 6,563,914 B2 | 5/2003 | Sammon et al. | |
| 6,564,193 B1 | 5/2003 | Shore et al. | |
| 6,564,321 B2 | 5/2003 | Bobo, II | |
| 6,594,032 B1 | 7/2003 | Hiroki et al. | |
| 6,597,688 B2 | 7/2003 | Narasimhan et al. | |
| 6,600,750 B1 | 7/2003 | Joffe et al. | |
| 6,614,551 B1 | 9/2003 | Peek | |
| 6,622,174 B1 * | 9/2003 | Ukita et al. | 709/246 |
| 6,625,642 B1 | 9/2003 | Naylor et al. | |
| 6,643,034 B1 | 11/2003 | Gordon et al. | |
| 6,650,440 B1 | 11/2003 | Wing | |
| 6,693,729 B1 | 2/2004 | Bloomfield | |
| 6,707,580 B1 | 3/2004 | Bloomfield | |
| 6,717,938 B1 | 4/2004 | D'Angelo | |
| 6,735,021 B2 | 5/2004 | Enomoto | |
| 6,742,161 B1 | 5/2004 | James et al. | |
| 6,744,761 B1 | 6/2004 | Neumann et al. | |
| 6,772,188 B1 | 8/2004 | Cloutier | |
| 6,781,721 B2 | 8/2004 | Toyoda et al. | |
| 6,785,021 B1 | 8/2004 | Gordon et al. | |
| 6,801,546 B1 | 10/2004 | Yoshida et al. | |
| 6,826,625 B1 | 11/2004 | Fujise et al. | |
| 6,857,007 B1 | 2/2005 | Bloomfield | |
| 6,857,074 B2 | 2/2005 | Bobo, II | |
| 6,865,258 B1 | 3/2005 | Polcyn | |
| 6,914,693 B1 | 7/2005 | Kirkeby | |
| 6,983,237 B2 | 1/2006 | Paterson et al. | |
| 6,999,478 B2 | 2/2006 | D'Angelo | |
| 7,020,132 B1 | 3/2006 | Narasimhan et al. | |
| 7,024,457 B1 | 4/2006 | Newman et al. | |
| 7,032,030 B1 | 4/2006 | Codignotto | |
| 7,035,901 B1 * | 4/2006 | Kumagai et al. | 709/206 |
| 7,079,275 B2 | 7/2006 | Henry | |
| 7,152,045 B2 | 12/2006 | Hoffman | |
| 7,164,488 B2 * | 1/2007 | Henry | 358/1.15 |
| 7,191,392 B1 | 3/2007 | Coar | |
| 7,202,978 B2 | 4/2007 | Gordon et al. | |
| 2001/0022669 A1 * | 9/2001 | Baba | 358/1.15 |
| 2002/0062363 A1 | 5/2002 | Naylor et al. | |
| 2002/0107824 A1 | 8/2002 | Ahmed | |
| 2002/0143804 A1 | 10/2002 | Dowdy | |
| 2003/0020959 A1 | 1/2003 | Henry | |
| 2003/0105725 A1 | 6/2003 | Hoffman | |
| 2003/0169730 A1 | 9/2003 | Narasimhan et al. | |
| 2004/0036914 A1 | 2/2004 | Kropf et al. | |
| 2004/0073709 A1 | 4/2004 | Bloomfield | |
| 2004/0125396 A1 | 7/2004 | Burke | |
| 2004/0165603 A1 | 8/2004 | D'Angelo et al. | |
| 2004/0215551 A1 | 10/2004 | Eder | |
| 2005/0012965 A1 | 1/2005 | Bloomfield | |
| 2005/0033771 A1 | 2/2005 | Schmitter et al. | |
| 2005/0131944 A1 | 6/2005 | Patrick et al. | |
| 2006/0010211 A1 | 1/2006 | Patrick et al. | |
| 2006/0031310 A1 | 2/2006 | Lee | |
| 2006/0167746 A1 | 7/2006 | Zucker | |
| 2006/0167774 A1 | 7/2006 | Zucker | |
| 2006/0195540 A1 | 8/2006 | Hamilton et al. | |
| 2006/0218032 A1 | 9/2006 | Patrick et al. | |
| 2006/0232827 A1 | 10/2006 | Gordon et al. | |
| 2007/0002388 A1 | 1/2007 | Henry | |
| 2007/0008574 A1 | 1/2007 | Henry et al. | |
| 2007/0024899 A1 | 2/2007 | Henry | |
| 2007/0036141 A1 | 2/2007 | Zucker | |
| 2007/0168557 A1 | 7/2007 | Henry | |
| 2007/0236749 A1 | 10/2007 | Henry et al. | |

FOREIGN PATENT DOCUMENTS

| | | |
|---|---|---|
| EP | 0798899 A1 | 10/1997 |
| EP | 0812100 A2 | 12/1997 |
| FR | 2748178 A | 10/1997 |
| WO | WO 96/41463 | 12/1996 |
| WO | WO 98/53603 | 11/1998 |
| WO | WO 99/56459 | 11/1999 |
| WO | WO 00/05654 | 2/2000 |
| WO | WO 00/78035 | 12/2000 |

OTHER PUBLICATIONS

Ferguson, "The Technology that Won't Die," Forbes, Apr. 5, 1999.
Lieberman, "Panasonic Machine Sends Faxes over the Internet," Computer Peripherals, Electronic Engineering Times, Nov. 10, 1997.
Liebmann, Market Focus: Fax Over IP, "As long distance rates drop, IP fax vendors lose their advantage over traditional faxing. But with a bit of redefinition and value adding, the vendors are sticking around, Rethinking IP Fax" Network Magazine, pp. 70-74.

Net Returns, "All for One and One for All,", The Industry Standard. Aug. 16-23, 1999, p. 120.

Newsome, "Some Facts on Free Online Fax Services," Inv. Bus. Daily Jul. 2, 1999.

Norr, "The Pitch for Free Internet Fax Services," San Francisco Chronicle, Apr. 1, 1999.

Supplementary European Search Report of Feb. 13, 2003 for Application No. EP01922392, 6 pages.

International Search Report of Oct. 31, 2001 for Application No. PCT/US2001/08218, 2 pages.

International Search Report of Nov. 25, 2003 for Application No. PCT/US2003/016743, 4 pages.

International Search Report and Written Opinion of Aug. 1, 2006 for Application No. PCT/US2006/05842, 13 pages.

International Search Report and Written Opinion of Jun. 5, 2008 for Application No. PCT/US2008/053658, 8 pages.

Office Action of Sep. 14, 2001 for U.S. Appl. No. 09/537,820, 12 pages.

Office Action of Jan. 30, 2004 for U.S. Appl. No. 10/155,808, 6 pages.

Office Action of Sep. 20, 2005 for U.S. Appl. No. 10/155,808, 6 pages.

Office Action of Feb. 22, 2006 for U.S. Appl. No. 10/155,808, 7 pages.

Office Action of Jan. 23, 2004 for U.S. Appl. No. 10/160,445, 6 pages.

Office Action of Jan. 7, 2008 for U.S. Appl. No. 11/348,613, 11 pages.

Office Action of Sep. 5, 2008 for U.S. Appl. No. 11/348,613, 10 pages.

Office Action of Apr. 15, 2009 for U.S. Appl. No. 11/348,613, 10 pages.

Office Action of Apr. 15, 2009 for U.S. Appl. No. 11/623,382, 14 pages.

Office Action of Aug. 17, 2009 for U.S. Appl. No. 11/894,811, 8 pages.

Teramura, et al. "Experimental Facsimile Communication System on Packet Switch Data Network", IEEE Transaction on Communications, vol. COM-29, No. 12, Issued Dec. 1981, pp. 1942-1951.

Office Action of Dec. 28, 2009 for U.S. Appl. No. 11/694,636, 9 pages.

Office Action of Dec. 28, 2009 for U.S. Appl. No. 11/894,816, 5 pages.

Office Action of Dec. 29, 2009 for U.S. Appl. No. 11/894,811, 12 pages.

Office Action of Jan. 11, 2010 for U.S. Appl. No. 11/357,360, 6 pages.

Office Action of Jan. 11, 2010 for U.S. Appl. No. 11/357,920, 6, pages.

Office Action of Jan. 11, 2010 for U.S. Appl. No. 11/694,645, 7, pages.

Supplementary European Search Report mailed Jan. 22, 2010 for European Patent Application No. EP06720881, 6 pages.

Non-Final Office Action of Mar. 30, 2010 for U.S. Appl. No. 11/694,651, 5 pages.

* cited by examiner

MongoFax Confirmation Page:

Your transmission was sent to the following e-mail address(es) or fax number(s)
E-Mail: john_doe@generic.com
E-Mail: jane_doe@generic.com
Fax #: (415) 555.5555

If any of these addresses or fax numbers are incorrect,
please carefully fill out a new e-mail
address page and re-send.

Tear along dotted line.                    Tear along dotted line.
- - - - - - - - - - - - - - - - - - - - - - - - - - - - - - - - -

Advertisement

Dream Vacations
Presents the chance to enter to win a free, 14 day sailing trip in the British Virgin Islands! Just fax back this request with your name and phone number indicated below, or take this coupon into a local travel agent.

☐ Check this box if you would like to be entered to win.

Fax Back to: (xxx) xxx-xxxx

Name:_____

Telephone:_____

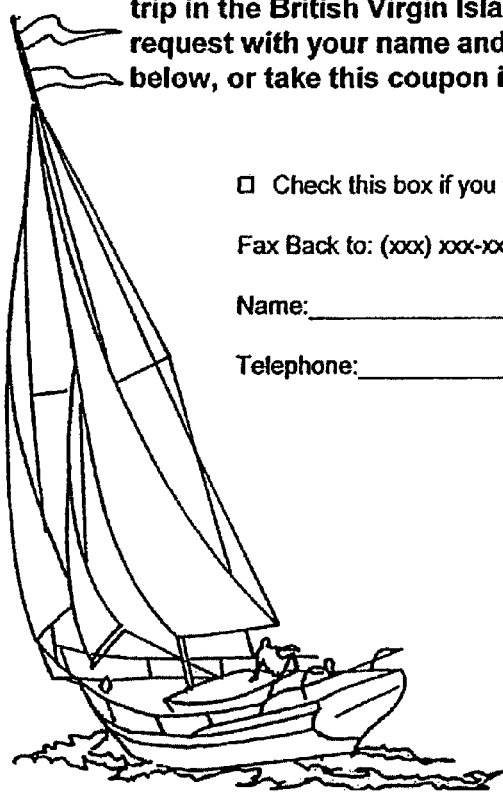

Your personal ID code is: 78W9ZST

FIG. 6A

MongoFax Confirmation

Your fax was sent to the following email address:

To: SYPANG@TOWNSEND.COM

From: MATT@MONGONET.NET

Please check above email addresses for accuracy. If any are correct, please create a new email Cover Page and try again. When hand printing, remember to write characters exactly as indicated and underline any boxes that contain number.

These are thumbnail images of the remaining pages of your 4 page fax.

[Company Logo]     MongoFAX* Tracking Number 0123456789999

410 — To:
420 — Cc:
430 — Bcc:
440 — From:
450 — Subject:
460 — Name File:
470 — Other:
480 — Other:
490 — Notes:

500
510 — ☐ Make contents searchable    Collate two-sided documents to one file: 550
520 — ☐ Archive to system    ☐ First Transmission: Odd pages   560
530 — ☐ Send certified and provide time-stamp receipt upon opening    ☐ Second Transmission: Even pages
540 — ☐ Provide electronic post mark receipt    ☐ Hand printing override — 570
— ☐ Seal document with digital watermark    ☐ Other MongoNet is not responsible for any damages due to character recognition or transmission errors. By using this product, you accept the terms of service posted at www.MongoNet.net. All Rights Reserved. U.S. Patent No. 6,424,426 and other patents pending. ©2000 MongoNet, Inc.
User Guide     Customer Service: 1 (866) 482-2229 or customersupport@MongoNet.net

Fax Only To: 1 (800) XXX-XXXX     MongoFAX
For best quality, adjust fax resolution prior to each transmission.     www.MongoNet.net

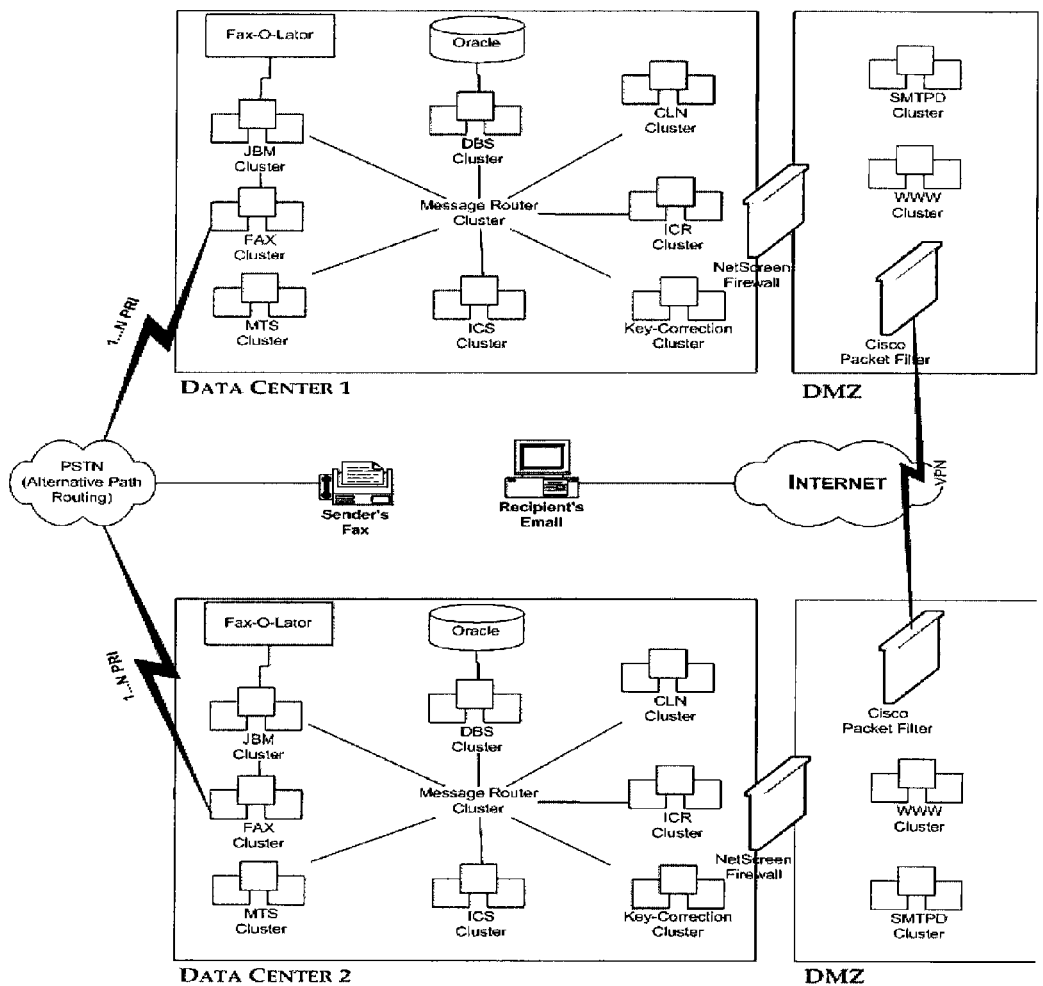

MONGOFAX PLATFORM OPTIONS

MONGOFAX LEVERAGES THE GEOGRAPHICALLY DISTRIBUTED NATURE OF THE FAX MACHINE, TURNING THEM INTO PDF SCANNERS WITH HIGHLY FLEXIBLE BACKEND DOCUMENT DELIVERY OPTIONS. SOME OF THESE DELIVERY OPTIONS INCLUDE:

MONGOFAX STANDARD: FAX PAPER TO ANY EMAIL ADDRESS AD PDF FROM ANY FAX MACHINE
MONGOFAX SECURE: FAX PAPER TO ANY EMAIL ADDRESS AS A URL LINK, RECIPIENT CONNECTS WITH SSL SECURE BROWSER, RECIPIENT DOWNLOADS FAX (PDF) AND PROVIDES CERTIFIED RECIPIENT

MONGOFAX COMPLIANCE ALL OUTBOUND TRADITIONAL FAX TRAFFIC BECOMES VIEWABLE IN CENTRALIZED WEB-BASED QUEUE FOR COMPLIANCE SCREENING PRIOR TO RELEASE OF ANY GIVEN TRANSMISSION

MONGOFAX DISTRIBUTED ARCHIVING & INDEXING: ALL FAX MACHINES BECOME SECURE PDF SCANNERS QUEUING DOCUMENTS TO A CUSTOMIZABLE WEB-FORM WITH PULL-DOWN MENUS AND DATA FIELDS FOR INDEXING AND ARCHIVING SCANNED DOCUMENTS AND DATA ENTRY FIELDS

MONGOFAX SECURE EMAIL APPLIANCE QUEUE: CUSTOMIZABLE BOLT-ON SERVER TO BE LOCATED ON CUSTOMER PREMISES FOR ANY OF THE ABOVE OPTIONS

FIG. 15

METHOD AND SYSTEM FOR TRANSFERRING SPONSORED DIGITIZED REPRESENTATIONS OF DOCUMENTS VIA COMPUTER NETWORK TRANSFER PROTOCOLS

CROSS-REFERENCE TO RELATED APPLICATIONS

The present application claims priority to and is a continuation-in-part application of commonly assigned U.S. patent application Ser. No. 10/160,445 filed on May 28, 2002, which is a continuation-in-part application of U.S. patent application Ser. No. 09/537,820 filed on Mar. 28, 2000, now U.S. Pat. No. 6,424,426. The present application also claims priority to Provisional No. 60/654,244, filed Feb. 17, 2005 and Provisional No. 60/756,749, filed Jan. 6, 2006. These disclosures are hereby incorporated by reference in their entirety for all purposes.

BACKGROUND OF THE INVENTION

The present invention relates to methods and apparatus for transferring digitized representations of documents via selected computer network transfer protocols. More particularly, some embodiments of the present invention provides for, receiving a digitized image representing a document (including text, images, or the like), converting the digitized representation from a first file format into a second file format, and outputting the second file to an appropriate destination based upon data derived from the digitized representation of the document, via a desired computer network transfer protocol.

In the past, fax images can be moved over the Internet by converting fax signals having a fax format to an email format (e.g. RFC-822). Once the conversion is completed, the email is then transferred over the Internet to the intended destination according to the Simple Mail Transfer Protocol (SMTP) or similar protocol. The Internet is the worldwide network of networks based on the TCP/IP (Transmission Control Protocol/Protocol). Currently, there are various subscriber based service that permit a subscriber to send fax images over the Internet.

According to one type of service, offered or previously offered by companies such as eFax, Jfax, a subscriber is provided with a unique telephone number. Any documents faxed to that number are converted to email format and transferred to the subscriber's email inbox. One drawback of this type of service is that it requires the subscriber to have a specific telephone number associated with their email address. A second drawback is that the subscriber must distribute the personal fax telephone number to any persons who would potentially want to send a fax to the subscriber. Finally, this type of service is expensive to operate from the service provider's perspective since the costs associated with buying and operating so many individual and dedicated phone numbers is very high.

Another type of service previously provided by UUNET (now WorldCom), requires a subscriber to attach additional hardware between the subscriber's fax machine and the service's network. The purpose of this service is to reduce long distance faxing costs for high volume users. The UUNET system converts a fax to the equivalent of an email and then routes the email over UUNET's network to the nearest UUFAX server. The UUFAX server converts the email back to fax format and transmits the fax using a local call to the fax machine at the destination. A drawback of this type of service is that it takes time and up-front hardware additions and expenditures to have access to the service.

Other types of client hardware solutions include products from RightFAX and HP Scanners. Drawbacks to these solutions are that a user must invest in expensive hardware.

Hence, it would be desirable to provide a method and system that is capable of efficiently transferring digitized documents through appropriate network protocols to desired destinations.

SUMMARY OF THE INVENTION

The present invention relates to methods and apparatus for automatically transferring digitized representations of documents via specified computer network protocols to electronic data destinations. More particularly, some embodiments of the present invention provide for receiving optically digitized representations of documents (e.g. text, images, etc.) Various methods are contemplated, including receiving a facsimile transmission via a facsimile machine (e.g. a stand alone machine, a computer); receiving digitized data from a scanner or multifunction copier/scanner; receiving digitized data from a digital camera (e.g. camera phone, PDA, digital camera, digital video camera); receiving a "print-to-file" file; or the like.

In various embodiments, the digitized data may be automatically converted from one data storage format to another storage format prior to transmission to the electronic data destinations. For example, facsimile transmissions may be converted into a widely-used file format, such as .pdf, .tiff, .doc, .txt, or the like; a scanned .tiff image may be converted into another graphics file format, such as .jpg, .bmp, .pdf, .gif, or the like. In various embodiments, the electronic data destination for the digitized data may be a web server, an e-mail server (e-mail box), a storage directory, a database, a storage network, an FTP location, a web server, a directory location, or the like. Further, in various embodiments, the data format may be a format appropriate for subsequent retrieval by a receiver via a number of different ways, such as via an e-mail client, via a web browser, via a web client, via a database management system, via a specified directory, or the like. In some embodiments of the present invention, various computer network protocols may be used to transfer the data to the intended destinations, such as HTTPS, FTP, HTTP, SMTP, WAP, or the like.

In the discussion bellow, some embodiments refer to a fax template or cover page, a fax machine, and a fax transmission. It should be understood that the fax template page is merely one embodiment of a cover page for a digitized representation of a document. Additionally, other apparatus for creating such a digitized template page include an optical scanner, a multifunction machine (e.g. copier/scanner), a digital camera, a computer or the like. Additionally, other transmission methods other than a fax to e-mail transmission are contemplated, such as a transmission using computer network protocols, using infrared or optical link, using a Bluetooth or other wireless link, and the like.

Embodiments of the Secure Document Transformation Architecture are engineered for scalability, security, privacy, reliability and compatibility. Various embodiments include an scalable architecture including:

1. Alternate-Path Telco Circuits are used to provide call failover in case of fiber outages. MongoNet super-trunks pairs of T1 circuits, guaranteeing both carrier and physical loop diversity thereby reducing the probability of an external service outage (i.e. a backhoe cutting fiber).

2. Multiple Data Centers are used to co-locate our Services with geographic diversity.

3. Clusters are used to bring high-availability to embodiments of the present invention (MongoNet Services). Various embodiments are deployed on RedHat AS 2.1 (Advanced Server) with a SAN backend.

4. Distributed, Threaded, Message-based Architecture provides the back-bone for MongoNet Services scalability, failover and fault tolerance.

5. Packages are used to ease the time to production for new server machines and for new releases of service software to existing machines.

Various embodiments of the present invention provide high-levels of security by reducing exposure to security exploits by deploying packet filtering, firewalling, and VLANing coupled with tight ACLs and access procedures. No outside or DMZ traffic is allowed into the internal subnets for any reason except at the initiation of an internal process (i.e. outbound email). For sites supporting the SMTP verb STARTTLS, embodiments are delivered via TLS. As an added layer of security, various embodiments can be delivered to a customer's SMTP server or posted to a customer URL for further handling (for compliance, indexing, and/or archiving). In still other embodiments, secure email appliance servers are also available as a bolt-on option for further customization within the customer's firewall.

Various embodiments provide a high level of privacy, as operation may be fully automated. In some embodiments, all documents are converted and routed via character recognition systems, such as described in the parent applications. Various embodiments of the present invention will not store any intermediate files unless instructed to do so by the customer as a custom account option. Under normal configurations, all content files are deleted instantly following the transmission of a transmission sent from various embodiments.

Various embodiments are directed to including "compliance" or "gatekeeper" features that allow a customer to view and approve all faxes or transmission before they are sent. Various secure embodiments sends a link to the fax recipient, or the like, (minus the PDF attachment) for secure login to receive the PDF. Such solutions may be used together and are fully hosted in various embodiments. In other embodiments, the customer may choose to install a Secure Email Appliance Server embodiment as a bolt-on within the customer's firewall. Various secure and compliance embodiments provide the customer with the highest levels of security possible, eliminating content delivery through email.

Embodiments of the present invention may maintain multiple instances of all services. Each request message presented to a service must conform to internal standards and may be presented to any instance of a particular service. Message Router response checking ensures that a response makes sense for the message presented. Various embodiments may be stateless. Various embodiments use an Oracle database in a HA (High-Availability) configuration.

Various embodiments utilize a template approach to email construction, or other delivery vehicle construction, thus providing a high degree of compatibility with customers' systems. If a site has a special constraining (i.e. no HTML mail), embodiments may be configured to meet the customer's needs. In some embodiments, Adobe® ubiquitous PDF format, freely available at www.adobe.com, are used.

According to one aspect of the invention, a method for a computer system is described. One technique includes receiving a facsimile transmission from a user, wherein the facsimile transmission includes a digitized representation of a document transmitted using a facsimile transmission format, processing the digitized representation of the document to determine a destination e-mail address, and reformatting at least a portion of the digitized representation of the document into an e-mail attachment format. Other techniques include processing at least a portion of the digitized representation of the document with an optical character recognition engine to determine one or more key words, providing the one or more key words to an advertisement server, and receiving the advertisement data from the advertisement server. Still other methods may include forming an e-mail message addressed to the destination e-mail address, wherein the e-mail message includes a body portion and an attachment portion, wherein the body portion includes the advertisement data, and wherein the attachment portion includes the portion of the digitized representation of the document in the e-mail attachment format.

According to another aspect of the invention, a computer system is described. One apparatus includes a memory configured to store a facsimile transmission from a user, wherein the facsimile transmission includes a digitized representation of a document transmitted using a facsimile transmission format. Another device includes a processor coupled to the memory, wherein the processor is configured to process the digitized representation of the document to determine at least one destination e-mail address, wherein the processor is configured to reformat at least a portion of the digitized representation of the document into an e-mail attachment format, wherein the processor is configured to determine advertisement data associated with the facsimile transmission, and wherein the processor is configure to form an e-mail message addressed to the destination e-mail address. In various embodiments, the e-mail message includes a body portion and an attachment portion, wherein the body portion includes the advertisement data, and wherein the attachment portion includes the portion of the digitized representation of the document in the e-mail attachment format. In other embodiments, the processor is configured to process at least a portion of the digitized representation of the document with an optical character recognition engine to determine one or more key words. In still other embodiments, the processor is configured to provide the one or more key words to an advertisement server.

According to yet another aspect of the invention, a computer program product for a computer system including a processor is described. One computer program product includes computer executable code that directs the processor to receive a facsimile transmission from a user, wherein the facsimile transmission includes a digitized representation of a document transmitted using a facsimile transmission format, that directs the processor to process the digitized representation of the document to determine a destination e-mail address, and that directs the processor to format at least a portion of the digitized representation of the document into an e-mail attachment format. Another computer program product includes code that directs the processor to process at least a portion of the digitized representation of the document with an optical character recognition engine to determine one or more key words, code that directs the processor to provide the one or more key words to an advertisement server, and code that directs the processor to receive the advertisement data from the advertisement server. Still other computer program product includes code that directs the processor to form an e-mail message addressed to the destination e-mail address, wherein the e-mail message includes a body portion and an attachment portion, wherein the body portion includes the advertisement data, wherein the attachment portion includes the portion of the digitized representation of the document in the e-mail attachment format. In various embodiments, a tangible media may store the computer executable code including magnetic media such as floppy disks, hard drives, network storage devices and removable hard disks, optical storage media such as CD-ROMS, DVDs, high capacity DVDs, holographic memory, and bar codes, semiconductor memories such as flash memories, read-only-memories (ROMS), and battery-backed volatile memories, and the like.

Reference to the remaining portions of the specification, including the drawings and claims, will realize other features and advantages of various embodiments of the present invention. Further features and advantages of various embodiments of the present invention, as well as the structure and operation of various embodiments of the present invention, are described in detail below with respect to accompanying drawings. Like reference numbers indicate identical or functionally similar elements.

BRIEF DESCRIPTION OF THE DRAWINGS

FIG. 6A is an exemplary illustration of a fax-to-email confirmation page received from the POP of FIG. 2;

FIG. 6B is another exemplary illustration of a fax-to-email confirmation page received from the POP of FIG. 2;

FIG. 11 is an example of another embodiment of the present invention;

FIG. 12 is an example of another embodiment of the present invention;

FIG. 15 is a simplified block diagram illustrating a network architecture overview according to embodiments of the present invention.

DETAILED DESCRIPTION OF THE INVENTION

Figure 1:
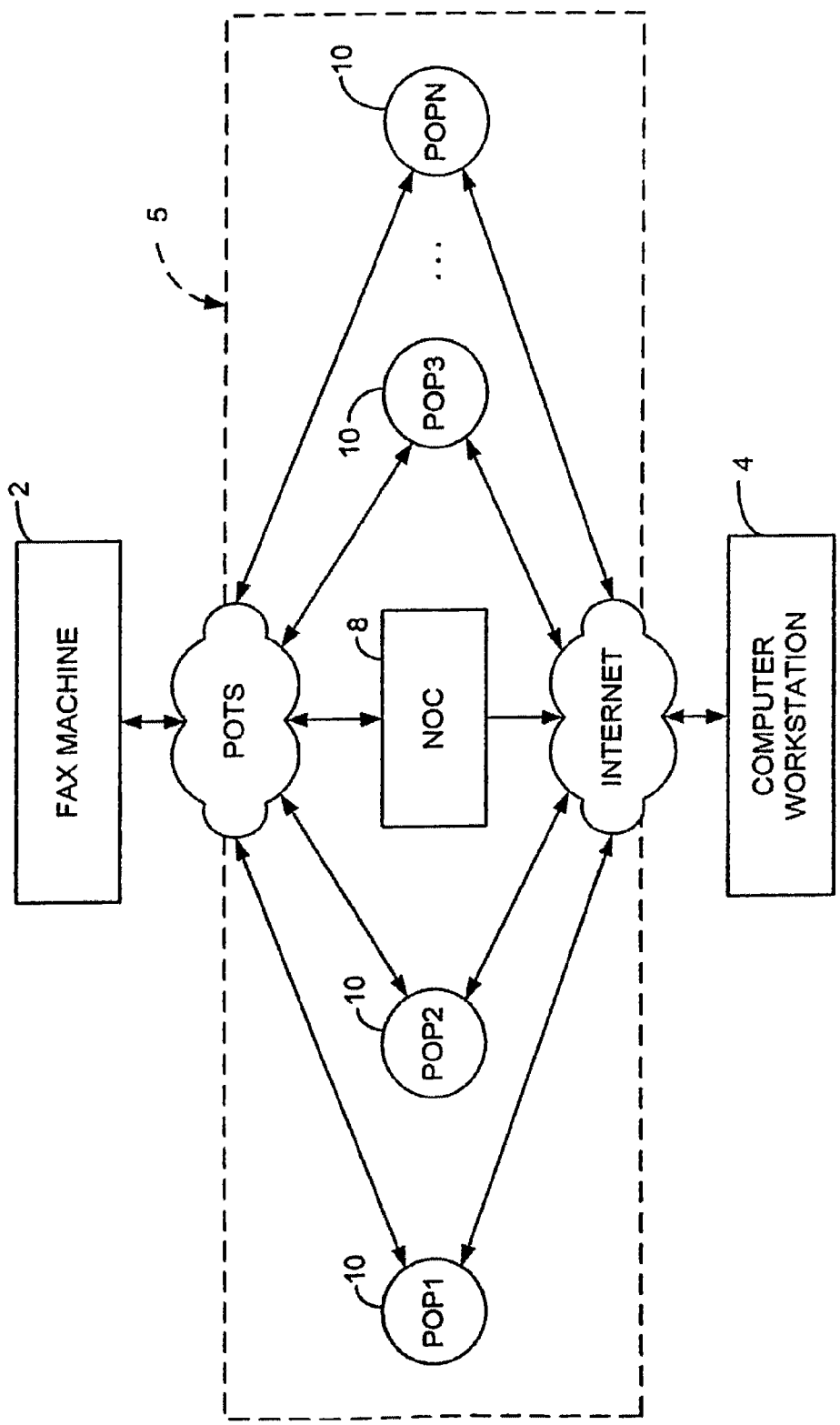
FIG. 1 is a simplified block diagram of a system according to an exemplary embodiment of the present invention.

The present invention in the form of one or more exemplary embodiments will now be described. FIG. 1 is a high-level block diagram of a facsimile/email communication system 5 according to one embodiment of the present invention. System 5 comprises a network operations center (NOC) 8, selectively coupled to both the Plain Old Telephone System (POTS) and the Internet, and a plurality of Points of Presence (POPs) 10 selectively coupled to NOC 8 via the POTs and the Internet. The "Internet," as meant here, means the worldwide network of networks based on the TCP/IP protocol and all means of access thereto (e.g. a local area network having an email system and being coupled to the Internet). (TCP/IP stands for "Transmission Control Protocol/Protocol" and is a language governing communication between all computers on the Internet.)

As will be explained in detail below, system 5 permits a user to, among other things, send an e-mail from any standalone fax machine 2 and receive faxes from a fax or email sender without having to distribute a unique and predefined fax number to the fax or email sender. Here, it should be emphasized that the fax machine 2, as shown in FIG. 1, is only a working example. In other words, fax machine as it is used in the context of various embodiments of the present invention may also comprise any facsimile protocol compliant communication device or any other scanning device. Similarly, computer workstation 4, in FIG. 1, is only a working example. In other words any device that is capable of sending an email may be used instead of computer workstation 4.

Figure 2:
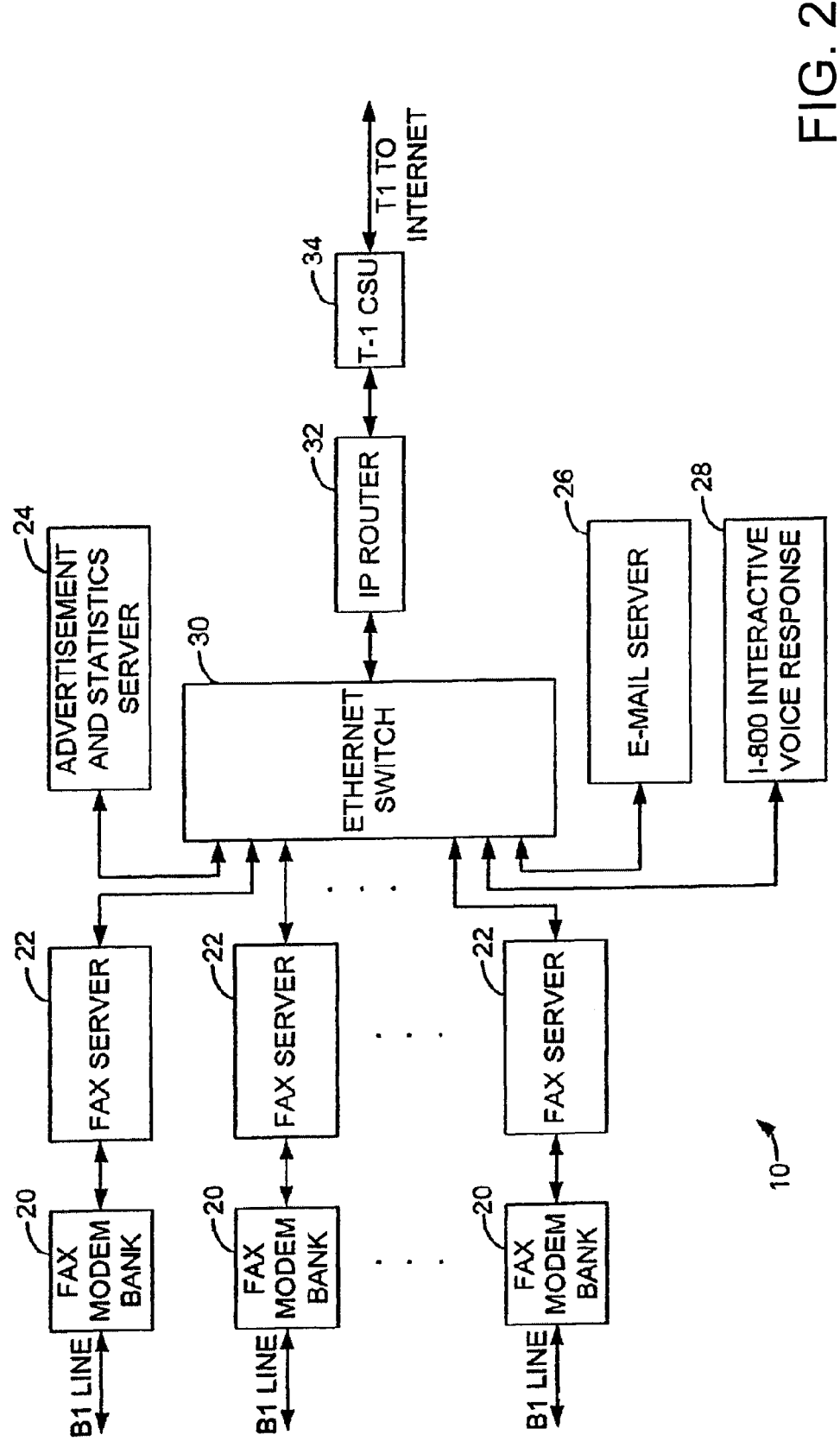
FIG. 2 is a simplified block diagram showing a hardware configuration of a Point of Presence (POP) providing a fax/email interface according to an exemplary embodiment of the present invention.

POPs 10 are distributed over a wide geographic area, for example, the United States or throughout the world. An exemplary embodiment of a POP 10 is shown in FIG. 2. POP 10 comprises one or more fax modem banks 20; one or more fax servers 22; an advertisement and statistics (ad/stat) server 24; an email server 26; an interactive voice response (IVR) unit 28; an Ethernet switch 30; an IP router 32; and a T-1 channel service unit (CSU) 34. It should be emphasized that the embodiment of POP 10 in FIG. 2 is only exemplary. For example, other configurations are within the spirit and scope of various embodiments of the present invention, including but not limited to use of higher-capacity Internet access lines (e.g. T-3), provision for multiple switched email servers, etc. FIGS. 1 and 2 will be described in further detail in the context of the description presented below.

Figures 3A, 3B:
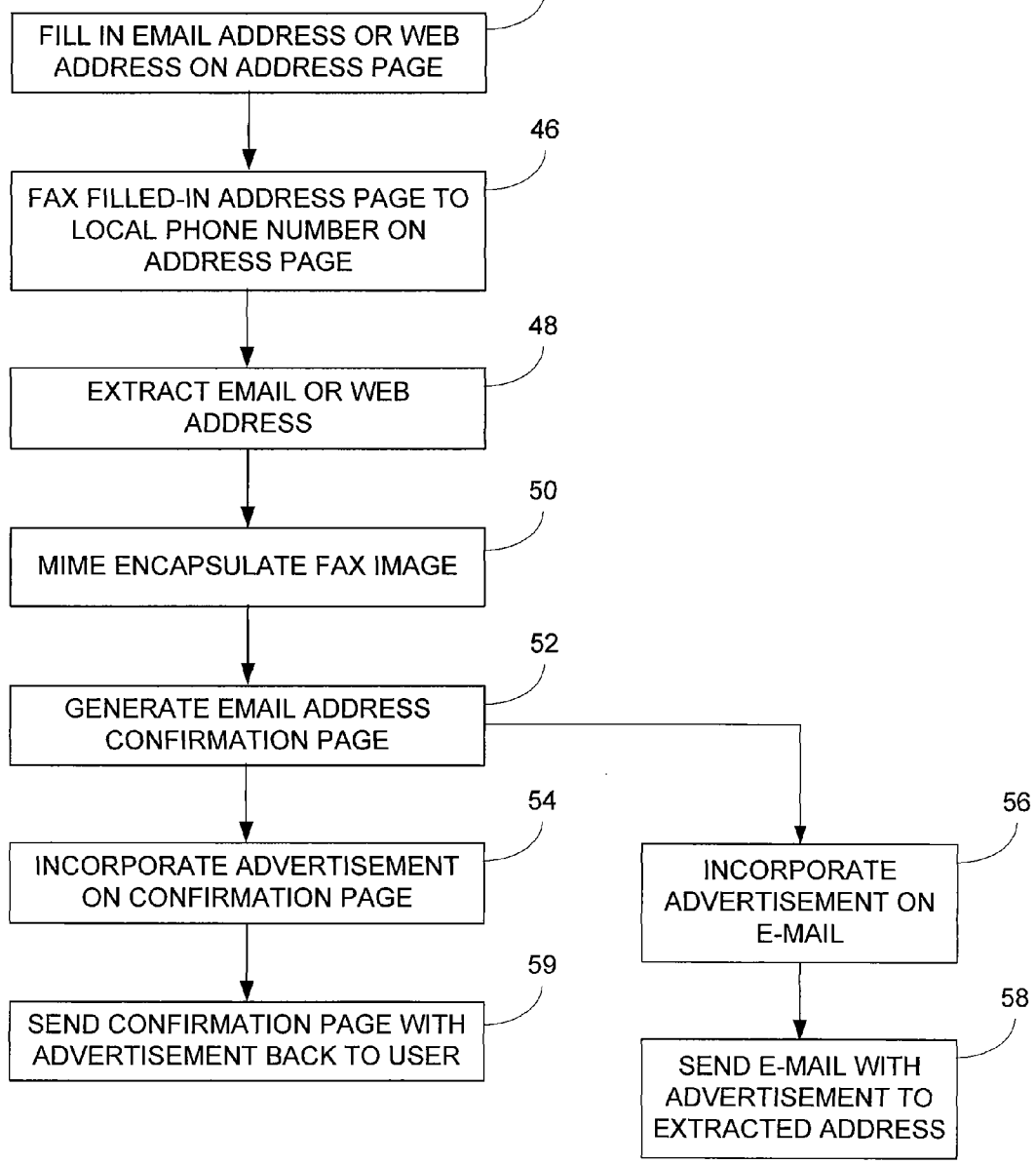
FIG. 3A is an illustration of a process of obtaining an email cover page, according to an exemplary embodiment of the present invention.
FIG. 3B is an illustration of a process of a user interacting with the system of the present invention to send an email from a fax machine, according to an exemplary embodiment of the present invention.

Referring now to FIG. 3A, there is shown an illustration of how a user obtains an "email cover page" from a fax server 22, according to an exemplary embodiment of the present invention. At step 40, the user dials a specific toll-free (e.g. 1-800) fax-back number from any fax machine or telephone. It should be understood that this fax-back number is not limited to a toll-free telephone number but may include any other type of telephone number as well. This fax-back number is routed by the telephone network via the POTS to a POP 10, based on the user's geographic locale. As shown in FIG. 2, fax modem bank 20 of POP 10 receives the fax over, for example, a B-1 line, which comprises 24-line telephone bundle. Then, at step 42, POP 10 sends a blank "email cover page" back to the user with further instructions on how to send an email from the user's fax machine.

Figure 4:
FIG. 4 is an exemplary illustration of an email cover page received from the POP of FIG. 2.

The email cover page looks like a normal fax cover sheet, but it contains lines of blank character boxes and a local telephone number the user can use so that the fax can be sent without the user having to incur any cost. The local telephone number is generated by a table driven translation process through automatic number identification, detectable from outbound 1-800 numbers. In an alternative embodiment each POP 10 of system 5 would be accessible using a single toll-free number. An exemplary email cover page is shown in FIG. 4. In one embodiment the character boxes 61 have "tick marks" 63 on the edges of each character box 61. Tick marks 63 have the effect of coercing the user to enter characters in the character boxes 61 but away from the character box edges. Characters entered away from the character box edges is beneficial, since later in the process, when character recognition is performed, the characters can be identified more accurately.

In one exemplary embodiment, the email cover page, or more generally, the cover page, further includes a list of special features or options that can be selected by a user. For example, one of the special features or options may be an archive option. If a user checks off this option, an archive copy of the facsimile or transmission is automatically generated and archived at a storage location. The storage location may vary depending on the design choice. For example, the storage location can be the sender's own computer system. Some other special features or options may be document format options. For instance, the document to be faxed or transmitted can be sent as text only within an email or sent as a Word attachment to an email (after using OCR techniques on the document), or sent as a PDF formatted attachment to an email (with or without selectable text). Based on the disclosure provided herein, other types of special features or options will be apparent to a person of ordinary skill in the art. Further details will be given below.

In an alternative exemplary embodiment, the cover page can be miniaturized to the size of small adhesive note sheets, such as, Post-its. A user can still fill in the requisite information on this miniaturized email cover page. Once completed, this miniaturized email cover page can then be adhered onto the front page of a document for facsimile transmission. Subsequent character recognition can be adjusted to heighten the sensitivity needed to locate and identify the miniaturized email cover page on the front page of the document. Due to the reduced size of the miniaturized email cover page, special markings or symbols, such as a unique bar code, may be included to facilitate the character recognition that needs to be performed to allow the email addresses to be more easily located and identified within the miniaturized email cover page. Miniaturized email cover pages can be sold as peel-off pads. When a document needs to be faxed to an email address, a user simply fills in the requisite information on the miniaturized email cover page, peels off the completed miniaturized email cover page and affixes it on the front page of the document.

In another alternative exemplary embodiment, an electronic version of the email cover page in the form of an electronic file is provided to a user via e-mail or download from a website. In this exemplary embodiment, the electronic file is implemented using PDF format. When implemented in this manner, the electronic file can be activated to generate the email cover page on a computer. The email cover page is then shown to a user. The user can then directly input the desired information onto the email cover page using an input device, such as, a keyboard. Information entered in this manner is more reliable, thereby minimizing the number of errors that might occur when subsequent character recognition is performed. The completed email cover page can then be printed out and faxed with the desired document.

In addition, when an electronic email cover page is used to capture the requisite information, some of the captured information, for example, the email address, can be regenerated on another part of the email cover page. For instance, the email address may be reprinted on another part of the email cover page, or alternatively, the email address may be encoded in bar code form, or other machine-readable format, and then be printed as part of the email cover page. This provides redundancy and further enhances the accuracy of the character recognition that needs to be performed subsequently.

Optionally, certain information on the email cover page may be rendered unreadable to the recipient of the email. For example, the fax number used by the sender may be printed within a grey scale pattern or the like, such as, a moiré pattern, in which the fax number is visible to the eye of the sender before the email cover page is faxed. When faxed, however, the fax number and the pattern will not be distinguishable from each other due to the limitations of fax scanning technology thereby rendering the fax number unusable to the recipient.

Referring now to FIG. 3B, there is shown an illustration of how a user interacts with the system 5 of various embodiments of the present invention to send an email from a fax machine, 2 according to an exemplary embodiment of the present invention. At step 44, the user fills in the letterboxes, in normal handwriting, with the final email address(es) it wishes to send to, e.g., "john_doe@generic.com". Alternatively, the email address can be printed in a machine-readable format. In an alternative exemplary embodiment, the email cover page includes an "advanced features page," which can be downloaded to the user's fax or email address. This advanced features page may also be generated at the user's computer. The advanced features page permits the user to select one or more options or services offered by the system 5 such as, for example, creating a group distribution list.

One or more group distribution lists for a particular user can be maintained by the system 5. For example, one or more group distribution lists may be associated with or linked to a particular sender email address. The email addresses within a group distribution list can be stored by the system 5. When filling out the email cover page, the user only needs to provide an alias or other identification information for a particular group distribution list. The system 5 is able to retrieve the sender email address and the alias for the particular group distribution list from the completed email cover page. The system 5 then looks up the group distribution lists associated with the sender email address and determines if the alias is associated with one of the group distribution lists linked to that sender email address. If so, the fax will be forwarded to all the email addresses in that group distribution list.

At step 46, the user sends the fax to the telephone number associated with the selected POP 10, where it is received by a fax modem bank 20 on fax server 22. Fax modem bank 20 includes an incoming fax spooler 60, which converts the fax to an image file format, which may be, for example the standard G3 TIFF format and then temporarily stores the imaged fax in a spool area on a local disk drive (not shown in the figures). The imaged email cover page is then transmitted to one of the fax servers 22 of POP 10 for further processing.

Figure 5:
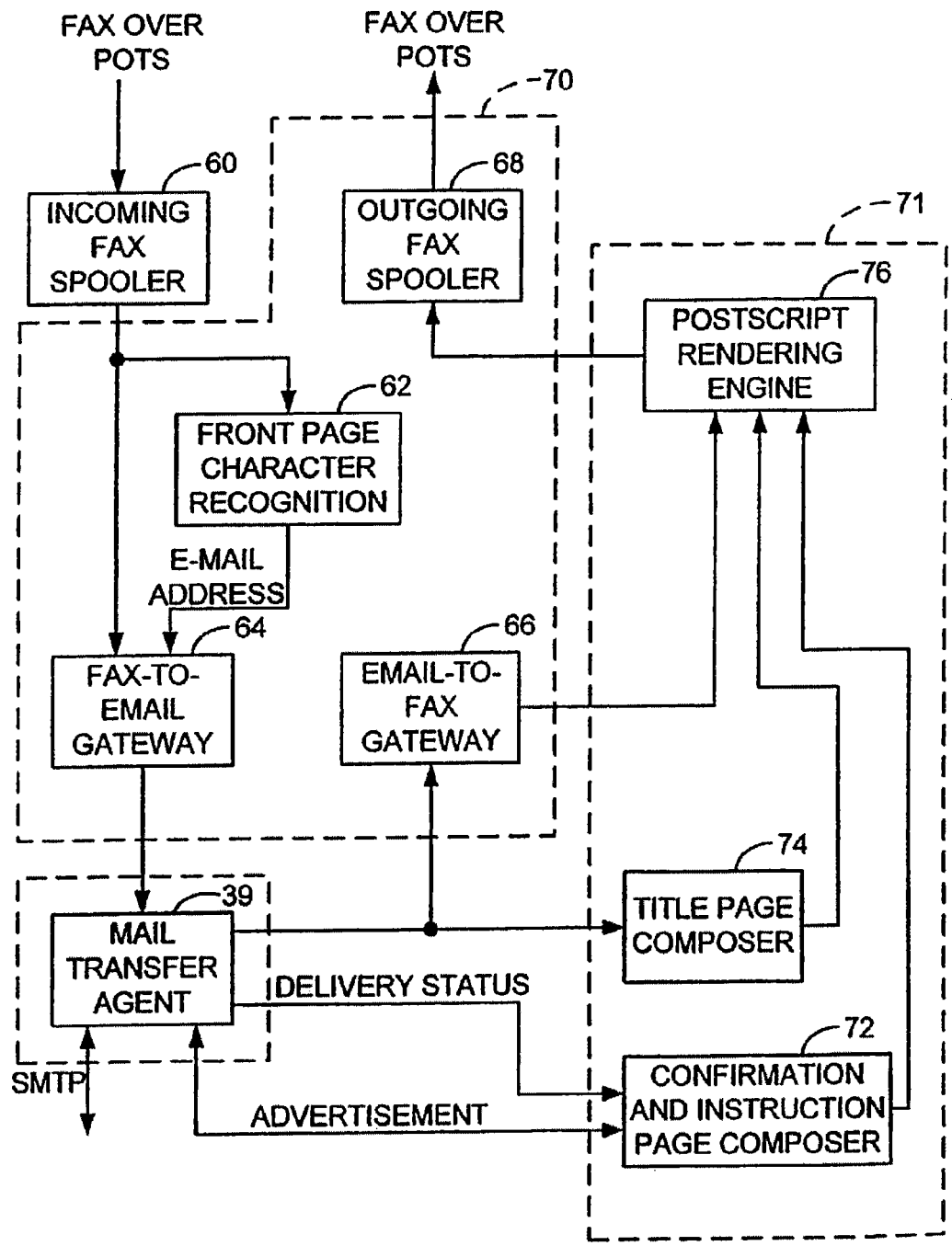
FIG. 5 is a simplified block diagram showing the software architecture of the POP of FIG. 2.

In addition to fax spooler 60, and as is shown in FIG. 5, the software architecture 70 for each fax server 22 comprises a front page (i.e. cover page) character recognition module 62, a fax-to-email gateway 64, an email-to-fax gateway 66 and an outgoing fax spooler 68.

At step 48, front page character recognition module 62 operates to extract the imaged email address from the imaged email cover page. Preferably, front page character recognition module 62 does this by optical character recognition (OCR). Optionally, the imaged email cover page may be cleansed or filtered as many times as is deemed appropriate to remove any undesired markings or patterns before the front page character recognition module 62 is invoked to perform its functions. Furthermore, as described above, the imaged email cover page may include redundant information relating to the imaged email address. The front page character recognition module 62 can be adjusted to cross-check the redundant information to ensure that the imaged email address is accurate.

At step 50, the electronic image of the fax is encapsulated and formatted into a MIME-compliant email message by fax-to-email gateway 64. "MIME" stands for Multipurpose Internet Mail Extensions and refers to an official Internet standard that specifies how email messages must be formatted so that they can be exchanged between different email systems. The electronic image of the fax is then transmitted to email server 26 as an attachment to the email. In an alternative exemplary embodiment, certain information is removed from the electronic image of the fax before it is transmitted to email server 26. For example, the specific fax number that is used by the sender may be scrubbed or otherwise rendered unreadable by the recipient of the email.

Upon receipt of the fax image by email server 26, email server 26 transmits the delivery status of the email to advertisement and statistics server (ad/stat server) 24. As shown in FIG. 5, the software architecture 71 of ad/stat server 24 comprises a confirmation and instruction page composer 72, a title page composer 74 and a PostScript rendering engine 76. Confirmation and instruction page composer 72 receives the delivery status of the email from email server 26 and subsequently generates delivery or non-delivery notifications and user instruction pages in PostScript format.

In an alternative exemplary embodiment, email server 26 and/or ad/stat server 24 may include a real-time billing engine (not shown). The real-time billing engine is used to keep track of usage by various users and generate the appropriate billing information accordingly. Usage may be tracked in a number of different ways. For example, usage may be tracked via minutes used against a specific fax number. In that regard, a user, such as a company, may be assigned one or more specific fax numbers for use by its employees. Usage against each specific fax number may be monitored by the real-time billing engine. Billing information may be calculated on a real-time basis and made available to authorized users via a website on the Internet. In addition, the billing information for each fax sent may also be included in a confirmation and instruction page as described below.

At step 52, confirmation and instruction page composer 72 generates a confirmation and instruction page, and, at step 54, retrieves advertisements from ad/stat server 24 and incorporates the advertisements into the confirmation and instruction page. Additionally, at step 56, confirmation and instruction page composer 72 retrieves advertisements from ad/stat server 24, which are incorporated, e.g. in banner format into the email. In various embodiments, the advertisements incorporated in the confirmation and instruction page are specifically targeted to the user's geographic locale, to the user based upon user profile, to the user base upon relevance of the message sent, or the like. In some embodiments, the system 5 determines the user's geographic locale from the user's fax number's prefix and/or area code and advertisements are then targeted based on demographic data characteristic of the user's neighborhood, e.g., average income bracket. In an alternative embodiment, the email address confirmation page includes an electronic commerce aspect, wherein the user is provided with a "check box" on the confirmation and instruction page, which the user can check to indicate further interest in a particular advertising offer. An exemplary embodiment of a confirmation and instruction page is shown in FIG. 6A. Optionally, the confirmation and instruction page may further include thumbnail sketches of one or more of the faxed pages, as shown in FIG. 6B.

In another alternative embodiment, a toll-based (e.g. 1-900) number is provided to the user at the beginning of the process, i.e., in lieu of step 10 in FIG. 3A, as a pay-per-use service. In such toll-based embodiments, advertisements may not be delivered to the sender, recipient, or other parties. In still other embodiments, a toll-free number (e.g. 1-800) may be provided to the user at the beginning of the process, as part of an advertising subsidized service where faxes, e-mail messages, e-mail attachments, and/or the like include advertisements. One such example was illustrated in FIG. 6, above. Additional examples of advertising subsidized embodiments will be given below.

In one alternative exemplary embodiment, upon receipt of the fax image by email server 26, email server 26 contacts ad/stat server 24 to retrieve preferences that may be associated with the email that is to be generated for that fax image. Preferences can be specific format, marketing information, graphics etc. and can be sender-oriented or recipient-oriented. Information from the email cover page, such as, account number, respective sender and recipient email addresses, fax number used by the sender or other unique markings or symbols, can be used to determine the preferences that are to be incorporated into the email. For example, if a fax is received from a sender using a specific fax number, the email to be generated from that fax may include information about that sender. If the specific fax number is dedicated for a particular company, certain company specific marketing information and graphics may be incorporated into the email to provide branding or standard look and feel.

In another alternative exemplary embodiment, the confirmation and instruction page may include dynamic content that is provided based on the sender's historical and/or past activities or behavior. The ad/stat server 24 may keep track of a sender's historical and/or past activities or behavior. For example, the ad/stat server 24 may keep track of the number of times faxes sent by a particular sender failed to go through because of poor handwriting or incorrect recipient email address. The ad/stat server 24 may even keep track of the type of problems that caused past failures, such as, a sender's handwriting of the letters "v" and "u" repeatedly caused faxes to fail to go through. Based on the sender's historical and/or past activities or behavior, the ad/stat server 24 then provides the appropriate information to the email server 26 to be included in the confirmation and instruction page. Such information may include, for example, tips or helpful hints to avoid problematic handwriting.

After the confirmation and instruction page has been composed, it is rasterized into a fax encoded bitmap image by PostScript rendering engine 76 and then sent to fax server 22 where outgoing fax spooler 68 operates to store the rasterized confirmation and instruction page on a local disk drive for subsequent delivery. Because bitmap image rendering is a computationally intensive process, a custom load-sharing software for distributing the rasterization process between a number of fax servers 22 machines may be employed as an alternative embodiment.

In another alternative exemplary embodiment, for promotional or marketing purposes, the email may further include a link that allows a recipient to use the services provided by the system 5 on a trial basis. The recipient/trial user may click on the link and be directed to a website. The website may show the trial user a trial offer and prompt the trial user to enter his/her email address to receive the trial offer. Assuming the trial user decides to take the trial offer and enters his/her email address, an electronic version of the email cover page is forwarded to the provided email address. This email cover page includes a specific fax number that is valid only for trial purposes. For example, this specific fax number may only be used for a limited number of fax transmissions. When the trial user uses the services provided by the system 5, the emails sent by the trial user similarly include links that allow the recipients to try the services, as described above.

At steps 58, the email (with the advertisements) is sent over the Internet to the intended recipient using, for example, SMTP protocol, and as an attachment in a standard format, e.g. GIF file, viewable on the majority of platforms.

In an alternative exemplary embodiment, a link to the email is sent over the Internet to the intended recipient. The link is created dynamically for each email. More specifically, the address for the link is randomly generated for an email on an ad hoc basis. This is done to protect against unauthorized access of the email. The intended recipient may then click on the link to retrieve and view the email.

Optionally, upon the intended recipient clicking on the link and viewing the email, a receipt is generated and forwarded to the sender to confirm that the intended recipient has received the email.

Figure 9:
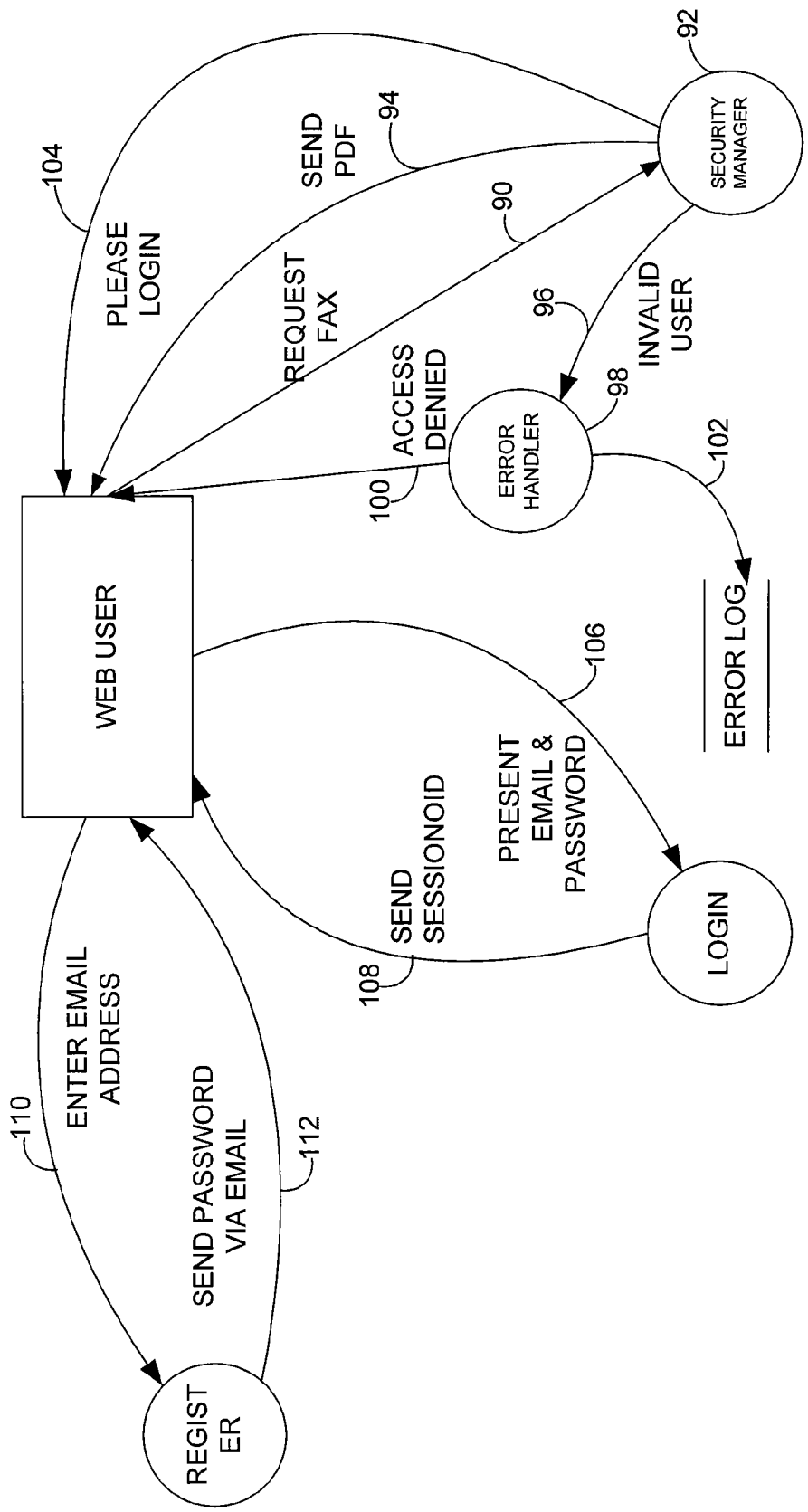
FIG. 9 is a flow diagram illustrating exemplary operations of a security mechanism used to protect against unauthorized access of emails in accordance with an exemplary embodiment of the present invention.

Optionally, when a link is used to access the email over Internet, a security mechanism is provided to allow only authorized access to the email by an intended recipient. FIG. 9 is a flow diagram illustrating exemplary operations of the security mechanism. As shown in FIG. 9, when a user receives a link, at 90, s/he clicks on the link to request access to the email or fax. By clicking on the link, the user in effect contacts a security manager 92 that controls access to the email. If the security manager 92 determines that the user is an authorized recipient, then access to the email is granted and, at 94, the security manager 92 may then send the email to the user. One way to determine that the user is an authorized recipient is for the security manager 92 to first check if the user has logged in with the security manager 92. If the user has logged in with the security manager 92, then certain credentials associated with the user is available. The credentials may include, for example, a session ID which is tied to the email address of the user. The security manager 92 then checks the email address of the user retrieved based on the credentials against the email address of the intended recipient of the email. If the two email addresses match, then the user is an authorized recipient of the requested email.

On the other hand, if the two email addresses do not match, then the user is validly logged on but is not an authorized recipient of the requested email. Then, at 96, the security manager 92 invokes an error handler routine 98. At 100, the error handler routine 98 informs the user that access to the requested email is denied because the user is not an authorized recipient. Optionally, at 102, the error handler routine 98 logs the denied request for archival and/or security purposes.

If the user is not logged in with the security manager 92, then at 104 the security manager 92 prompts the user to login. To login, at 106, the user presents his/her email address and password. The password is given at the time the user registers with the security manager 92. If the email address for the user and the provided password match those maintained by the security manager 92, at 108, the user is considered logged in and credentials such as a session ID are forwarded to the user.

Once the user has the credentials, the process as described above can be repeated to determine if the user is an authorized recipient.

If the user is not a registered with the security manager 92, i.e., the user does not have a password associated with his/her email address, the user is then prompted to register with security manager 92. To register with the security manager 92, at 110, the user provides his/her email address. Upon receiving the email address, the security manager 92 generates a password that is linked to that email address and, at 112, forwards the password to the user. The security manager 92 also creates an account for the user for future reference.

Finally, at step 59, the confirmation and instruction page is sent to the user for confirmation purposes, the confirmation and instruction page possibly incorporating an advertisement as explained above. For example, the confirmation and instruction page can be sent over the POTS to the user in the form of a confirmation fax if a fax number for the sender is available; similarly, the confirmation and instruction page can also be sent to the user in the form of a confirmation email or as a part thereof.

In an alternative exemplary embodiment, the confirmation and instruction page may also be sent to other e-mail addresses. For example, if the fax that is sent relates to company business, a confirmation copy of the email generated from that fax may be forwarded to the company's archive or storage facility for storage or archive purposes. In one example, the user may specify the archive or storage facility via the specification of a specific account in one field. For example, one transmission may include a CC field entry of "03111995@webpost.com." In this example, "03111995" represents the account number, and "webpost.com" represents the server the transmission may be sent to. Additionally, in this example the CC and/or BCC field entry includes "moldreport.pdf." In this example, the transmission attachment is then stored under the name "moldreport.pdf" for storage at "webpost.com" in account number "03111995." Custom fields for specification for such data are disclosed in FIG. 11. In light of this disclosure, one of ordinary skill in the art can imagine many other embodiments of the present invention.

At this point, it should be emphasized that, whereas the software modules of the software architecture of FIG. 5 are shown to be distributed over multiple servers, one skilled in the art would understand that all the software modules could reside on a single server or on different servers than is shown in the embodiment of FIG. 5.

In an alternative exemplary embodiment, a user can interact with the system of various embodiments of the present invention to send a facsimile from any standalone facsimile machine to any other standalone facsimile machine. To do this, the user procures a "facsimile number page," as for example, similar to procuring the "email cover page" described above in relation to steps 40 and 42. The user then enters a facsimile number of the intended facsimile recipient, for example, in handwritten format or printed machine readable format, and then faxes the facsimile to the local number of the selected POP 10 as in steps 44 and 46 described above (or, alternative, enters a pay-per-use toll-based number as is also described above). Upon receipt of the facsimile by the selected POP 10, the facsimile number is then extracted and the electronic image of the facsimile is formatted into a MIME-complaint email message by fax-to-email gateway 64, similar to steps 48 and 50 above. Next, email server 26 transmits the MIME image to an email-to-fax gateway 66, which could reside on a different POP 10, where the email-to-fax gateway 66 converts the MIME image into a text-formatted (e.g. PostScript) file. Then, PostScript rendering engine 96 operates to rasterize the text-formatted file into a fax encoded bit map image. And, finally, outgoing fax spooler 68 receives the fax encoded bit map image and transmits it to the intended facsimile recipient.

In yet another exemplary embodiment of the present invention, web pages can be downloaded via fax. In this embodiment, a user is provided with an "email cover page" as described above. This email cover page provides letterboxes for entering the desired web address (which, for example can be entered in normal handwriting or printed in a machine readable format) and an indicator of some sort, which the user can use to request the number of pages from the web address the user wishes to download. One type of indicator on the cover page, for example, could be a series of bubbles positioned at predetermined positions on the cover page.

Figure 7:
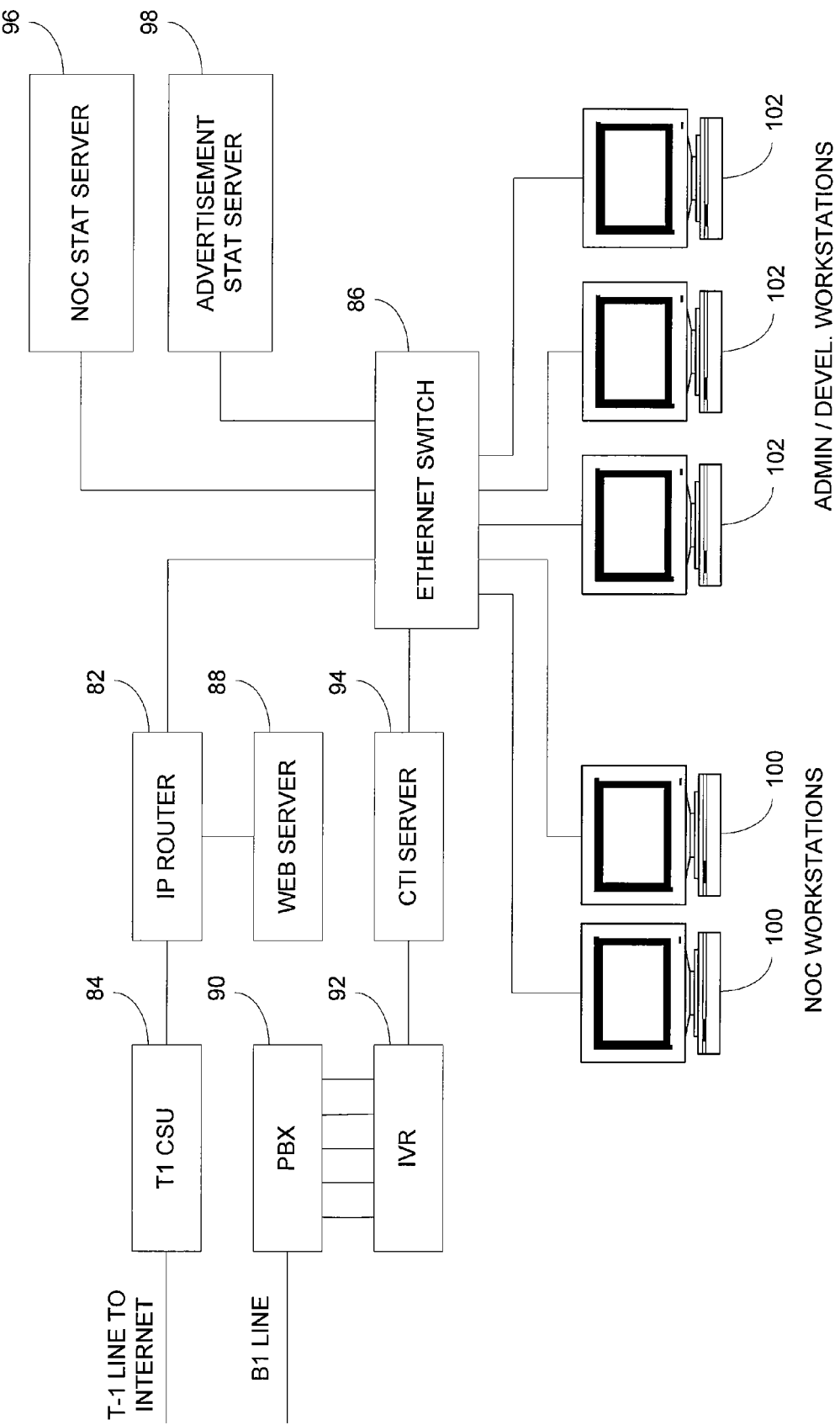
FIG. 7 is a simplified block diagram of a network operations center (NOC)

Referring now to FIG. 7, there is shown a network operations center (NOC) 8, according to an exemplary embodiment of the present invention. NOC 8 functions as the system headquarters and is configured to communicate with all POPs 10, as was shown and described in reference to FIG. 1. NOC 8 comprises an Internet access router and firewall component (IP router) 82 coupled between the Internet via, for example, a T1 channel service unit (CSU) 84 and an Ethernet switch 86 (at a data rate of, for example, 100 Mbps); a web server 88 coupled to IP router 82; a private branch exchange (PBX) 90 coupled to the telephone network via, for example, a B-1 line; an interactive voice response (IVR) unit 92 coupled to PBX 90 and a computer-telephony integrated (CTI) server 94 coupled between IVR unit 92 and Ethernet switch 86. Also coupled to Ethernet switch 86 is an NOC statistics server 96; an NOC advertisement statistics server 98; NOC workstations 100; and administrative/development workstations 102.

In the various embodiments, computer code is stored and executed within tangible memory of NOC 8 to effect the functions described herein. Additionally, the tangible memory may be used to stored facsimile transmissions, format converters, status data, optical character engines, advertisement engines, operating systems, and other types of data describe in the present patent application. In various embodiments, tangible media may include magnetic media such as floppy disks, hard drives, network storage devices and removable hard disks, optical storage media such as CD-ROMS, DVDs, holographic memory, and bar codes, semiconductor memories such as flash memories, read-only-memories (ROMS), and battery-backed volatile memories, and the like.

NOC advertisement statistics server 98 stores, and makes available to advertisers, statistics relating to the advertiser's advertisement(s), for example, the number of times the advertisement was sent, the number of positive responses from viewers of the advertisement, a qualitative measure of the party the advertisement was sent to, etc.

NOC administrative/development workstations function as a help desk to those users who log on to web server 88 and also allow the system provider to do development, for example, improving the functionality of the web site provided by web server 88.

IVR unit 92 permits a user to dial into the NOC via PBX 90 using the same 1-800 toll free access number used in the initiation of a fax-to-email process described above. IVR 92 provides user's with voice prompts, which the user can respond to using the telephone keypad. The prompts may relate to, for example, use instructions or may permit a user to download information from the Internet, e.g. stock quotes, weather predictions, travel information, etc.

Figure 8A:
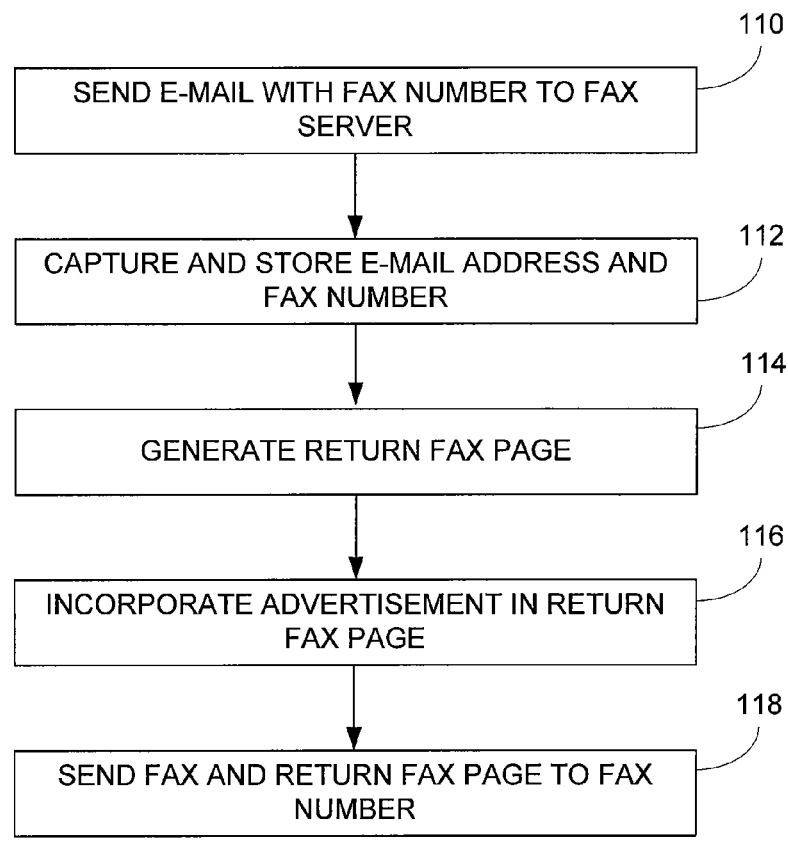
FIG. 8A is an illustration of a process of a user interacting with the system of the present invention to send a fax from an email, according to an exemplary embodiment of the present invention.

In another embodiment of the present invention, a user can logon to web server 88 from, for example, a computer workstation 4 (See FIG. 1), and then send a fax from an email to any standalone fax machine. An exemplary process for accomplishing this is shown in FIG. 8A.

At step 110, after the user logs on to web server 88 (See FIG. 7), the user sends an email to web server 88. Then, at step 112, web server 88 captures and stores the user's email address and the fax number to which the user wishes to send the fax. This information is relayed over the Internet to email server 26 of the, preferably, nearest POP 10, to which the fax number is associated. As shown in FIG. 5, each email server 26 contains a mail transfer agent 39, which accepts the email from NOC 8. Email-to-fax gateway 66 then operates to convert the email message into PostScript text.

At step 114 title page composer 74 generates a return fax page, and, at step 116 retrieves advertisements from ad/stat server 24 and incorporates the advertisements into the return fax page. Preferably, the advertisements are specifically targeted to the fax recipient's location. The system 5 determines this from the recipient's fax number's prefix and area code by comparing the numbers to area code and prefix numbers stored in ad/stat server 24. Once the neighborhood is identified, advertisements are then targeted based on demographic data characteristic of the recipient's neighborhood, e.g., average income bracket. In an alternative embodiment, the return fax page includes an electronic commerce aspect, wherein the fax recipient is provided with a "check box" on the return fax page, which the recipient can check to indicate further interest in a particular advertising offer.

After the return fax page has been composed, it and the converted fax image are rasterized into a fax encoded bitmap image by PostScript rendering engine 76 and then sent to a fax modem bank 20 of POP 10 where outgoing fax spooler 68 operates to store the rasterized fax and return fax page on a local disk drive for subsequent delivery.

At step 118, the fax and return fax page are sent over the POTS to the fax recipient.

Figure 8B:
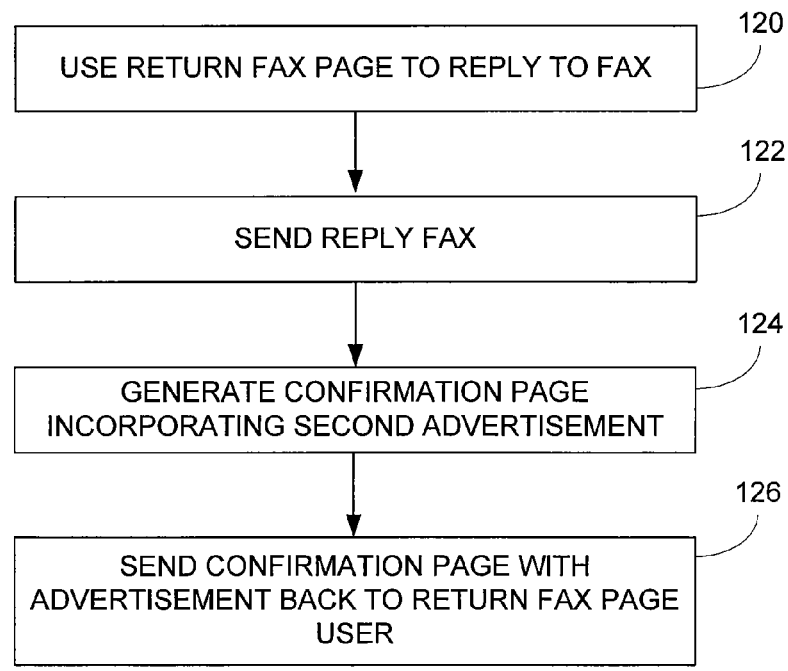
FIG. 8B is an illustration of a reply process wherein a recipient of the fax, delivered in the process according to FIG. 8A, replies to the fax using a return fax page.

Referring now to FIG. 8B, at step 120, upon receipt of the fax and return fax page, the fax recipient uses the return fax page to reply to the fax and sends the reply fax at step 122.

At step 124, title page composer 74 of ad/stat server 24 operates to generate a confirmation page incorporating a second advertisement, which is then, at step 126, sent back to the return fax page user. Steps 124 and 126 substantially follow the steps 54 and 59 as described in reference to the fax-to-email process of FIG. 3B.

The advertising subsidized aspect of the system and method of various embodiments of the present invention also allows a user to send a fax from any standalone fax machine to any other standalone fax machine for free, thereby avoiding long distance telephone charges, which are typically billed for any long-distance fax transmission. To accomplish this, a user simply dials the toll free (1-800) access number, as explained above, to obtain a local number to a POP 10. Local POP 10 then responds by faxing back a cover page to the user. Steps 44 through 48 are then performed, as was described in relation to FIG. 3B, followed by steps 110 through 118 as was described previously in relation to FIG. 8A. The only difference from the process as described above would be to provide letterboxes for fax addresses on the cover page and provide for OCR capability for extracting fax addresses.

In another alternative embodiment of the present invention, NOC 8 includes a local database (not shown in FIG. 7), which is configured to store a frequent user's email address book. The user can logon to web server 88, upload the address book and associate nicknames or real names with each email address (e.g. "John Doe" for john_doe@generic.com). By doing this, the user can then send emails from any standalone fax machine simply by filling in the letterboxes of the email cover page (as described previously with respect to FIG. 3B) with the nickname or real name of the intended recipient.

Finally, in another exemplary embodiment of the present invention, advertisers are provided with a "dynamic print advertising" service, whereby an advertiser can logon to web server 88 of NOC 8, open an account, create advertisements and customize them based on specific demographic information.

Figure 10:
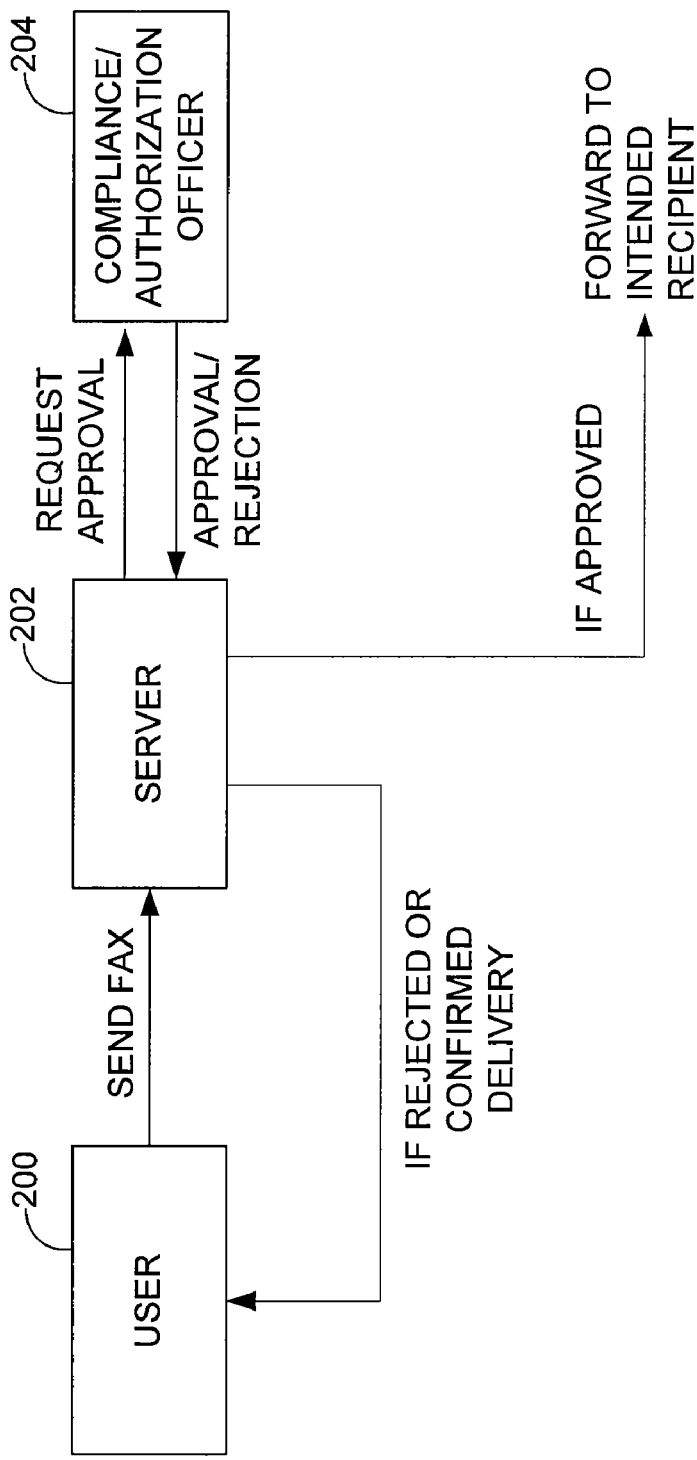
FIG. 10 is a simplified block diagram illustrating an exemplary application in accordance with the present invention.

Various embodiments of the present invention as described above can be deployed in many different applications. FIG. 10 is a simplified block diagram illustrating an exemplary application in accordance with the present invention. As shown in FIG. 10, a user 200 faxes a document using the system 5 as described above. The faxed document is received by a server 202 and put in a processing queue to await processing. When the faxed document is processed, an email generated based on the faxed document is forwarded to a compliance/authorization officer 204. The email may be delivered to the compliance/authorization officer 204 using a number of different methods; but preferably, the email is delivered through a secure website or a virtual private network. In this particular application, the compliance/authorization officer 204 reviews the email to determine if it is allowed to be sent to its intended recipient. After the email has been reviewed, the compliance/authorization officer 204 relays its approval/rejection back to the server 202 for further actions. If an approval is given, then the server 202 forwards the email to the intended recipient. Optionally, a confirmation for delivery may be forwarded to the user 200. On the other hand, if a rejection is given, then the server 202 prevents the email from being sent to the intended recipient and informs the user 200 of the actions taken. Based on the disclosure provided herein, a person of ordinary skill in the art will know of other ways and/or manners to apply various embodiments of the present invention.

In an alternative exemplary embodiment, the system 5 is capable of handling inputs having different types of electronic formats. For example, instead of a user sending a document via a fax machine, the user may choose to first use a scanner to scan the document into a scanned image. The scanned image of the document is then forwarded to the fax server 22. Depending on the scanning technology used to produce the scanned image, the fax server 22 accordingly converts the scanned image for processing as described above. Based on the disclosure and teachings provided herein, a person of ordinary skill in the art will be able to implement various embodiments of the present invention to handle inputs with different types of electronic formats.

In light of the above, various embodiments allow a user to, among other things, send a fax or other electronic communication from stand-alone fax machine, scanner, or the like. Based upon the data graphically included on the fax or other electronic communication, the fax or other electronic communication is routed to the appropriate destination. For example, the communication may be routed to an e-mail inbox, Novel Template Cover Page FIG. 11 illustrates an example of a novel template page (cover page), which may be optically digitized via a facsimile machine. In various embodiments, the fax template page is derived from an Adobe .pdf document type that is opened via Adobe Reader™ software. In various embodiments, the fax template page includes "fill-in" capability, that allows the user to type-in information onto the page. As will be described in-depth below, within the template page, the user may enter a variety of data and may make a number of functional choices for transmission purposes.

In other embodiments of the present invention, the template page can be derived from other sources. In one example, the template page may be derived in response to a web-based form submission where the user inputs data on a web form, as was mentioned earlier. In such an example, when the user is finished typing-in data, the web server provides a user with a digitized representation of a filled-in template page she can print-out, or save electronically. In an alternative embodiment, for security and accounting purposes, the filled-in template page may be sent to the FROM sender's e-mail address. In such embodiments, the web server, or the like checks whether the sender's e-mail address is authorized to receive the template page, before sending the filled-in template page.

In off-line embodiments, the template page may be derived from an office-productivity macro plug-in, such as Word, Excel, or the like that prompts the user for information. In such examples, after the user enters the data, the data automatically populates fields within in a document. The document can then be printed out, "printed-to-file" in the computer, or the like.

In the embodiment in FIG. 11, a number of fields are illustrated. In other embodiments, a greater or fewer number of fields may be used for the template page. In FIG. 11, the template page 400 includes a to field 410, a carbon copy field 420, a blind carbon copy field 430, a from field 440, a subject field 450, a filename specification field 460, custom fields 470 and 480, and a notes field 490.

As will be described below, fields 410-480 typically include human and machine readable data upon which optical character recognition (OCR) techniques operate, so as to determine the transmission destinations, e.g. e-mail addresses of the sender, cc recipients, the receiver, fax numbers, or other destinations. If OCR techniques provide ambiguous results, a human operator may review data entered in these fields in order to attempt to determine the intended e-mail addresses, or the like. In various embodiments, a human operator may also provide feedback to the sender regarding the quality of the transmission, e.g. the scanner or fax machine has a dirty scanning surface, or the like.

Importantly, data in notes field 490 and any page after template page 400 is inaccessible to human operator review while in transit from the sender to the recipient. Such data is kept in encrypted form on typical transmission servers. Accordingly, any confidential data within notes field 490 and within the document are secure and cannot be accessed or relied-on by an operator.

In some embodiments of the present invention, when a filled-in template page 400 is received by a server, images of fields 410-480 are extracted (along with bar codes 590 and 600, described below) from the original transmission. The images are then recognized using OCR techniques to attempt to recognize the routing data (e.g. e-mail addresses, fax numbers, data format and the like). After the data from fields 410-480 are recognized and used for transmission purposes, the data may be discarded, may be used for logging purposes, etc. Any other data present in the original transmission besides specified portions of template page 400 are not viewable, and the transmission is kept secure and confidential. Additionally, after the original transmission has be transformed and sent to the appropriate destinations, the original transmission and the sent transmission are deleted and cannot be recovered. Some embodiments may allow a compliance officer, or the like, to review the transmission before it is sent, as was described above, and will be discussed further below.

As shown in FIG. 11, a variety of functional options are provided in template page 400 including an option 500 to make the filled-in data searchable, an option 510 to electronically archive the transmission, an option 520 to initiate a certification process for time-stamped delivery or access of a transmission, an option 530 to provide an electronic post mark receipt, an option 540 to imprint a digital watermark to the transmission, options 550 and 560 for two-sided document transmissions, option 570 to indicate whether the handprinted data should have precedence over any machine-recognized data on fields such as To field 410, Carbon copy field 420, blind carbon copy field 430, from field 450, and the like.

In various embodiments, when the filled-in data are selected to be searchable (option 500), optical character recognition techniques may be used to convert the digitized representation of the document into searchable text (e.g. ASCII characters) and graphics. Other types of OCR engines may be used to recognize characters of other written languages such as Chinese characters, Japanese Kana characters, Korean phonetic characters, Hebrew characters, Arabic characters, and the like. In one embodiment, a text file based upon the recognized text may be provided to the recipient, as mentioned above. In another embodiment, where the document is converted into a .pdf format, the recognized text is stored as part of the .pdf file, however is not typically visible to the user. Instead, the user typically views the digitized representation of the document. In some embodiments, the searchable text may be searched for archiving purposes, advertisement purposes, or the like, as will be discussed below.

In other embodiments of the present invention, where the digitized representation of a document is to be stored in an electronic data archive, data warehouse or the like, the searchable text may be used for document indexing of the digitized representation in the data archiving system. The document may subsequently be identified within the data archive based upon the indexed terms. For example, words from the document that are repeatedly recognized by the OCR may be used as key words. For example, a transmission including a digitized representation of a home loan application may be associated with the key words "home loan" and/or "application for home loan." In such examples, the received transmission may be converted from the facsimile format, for example, into another form, such as a .PDF format, and the .PDF format document may be stored in a file management system under the key words "home loan" and/or "application for home loan." In other embodiments, the key words used may be manually specified by the sender of the transmission. For example, the user may specify the key words for OCRing in subject field 450, custom fields 470 and 480, notes field 490, or the like.

In other embodiments of the present invention, where the digitized representation of a document is to be stored in an electronic data archive, data warehouse or the like, the filename and location of the archive may be provided in subject field 450, filename field 460, custom fields 470 and 480, notes field 490, TO field 410, CC field 120, BCC field 130, FROM field 140, or the like. As one example, the user may specify the archive server or storage facility via the specification of a specific account in one field. For example, one transmission may include a TO field 410 entry of "09101960@webpost.com." In this example, "09101960" represents the account number of the user, or the like, and "webpost.com" represents the server the transmission may be sent to. Additionally, in this example filename field 460, CC field 120, or the like includes "Lawrence Wells Fargo Statements.pdf." In this example, the transmission attachment is then stored under the name "Lawrence Wells Fargo Satements.pdf" for storage at "webpost.com" in account number "09101960." In various embodiments, any number of transmission protocols may be used by NOC 8, POP server 10, or the like, to post the document at the desired location, such as FTP, a secure protocol, or the like. In light of this disclosure, one of ordinary skill in the art can imagine many other embodiments of the present invention.

Also shown in FIG. 11 is a transmission tracking number 580. Additionally bar codes 590 and 600 are illustrated at different orientations and different positions on template page 400. In some embodiments, transmission tracking number 580, and barcodes 590 and 600 are generated within Adobe Reader™ and implemented as a plug-in application. Further details will be given below.

In some embodiments of the present invention, less than all of the above fields and options may be provided on the template page. For example, in one embodiment, simply to field 410, and from field 440 are supported, in another embodiment, To field 410, from field 440, and subject field 450, are included on the template page, etc.

Billing Issues

In some embodiments of the present invention, where the template page is for a facsimile, a dial-in fax number listed on template page 400 is associated with a particular organization. Accordingly, billing to the organization may be tracked based upon the traffic sent to the dial-in fax number. In other embodiments, the billing may be based upon the senders' sending fax number. In such cases, a number of sending fax numbers may be associated with a particular organization, and as faxes are received from one of these sending fax numbers, the usage may be billed back to the particular organization by transmission server 5.

Some embodiments of the present invention may be embodied as a public kiosk fax machine or the like. Such kiosks may be found in airports, libraries, hotels, convention centers, and the like. In such embodiments, a magnetic stripe reader, smart card reader, keypad or keyboard, coin and bill slots, a biometric input device and the like may be provided allowing the user to provide payment for services. For example, for payment, a user may swipe a credit card and enter a billing zip code; a user may swipe a bank card or debit card and enter a password; a user may use a smart card reader and enter a password, or other secure stored value or credit card or token; a user may input paper or coin currency or the like. After a user document is scanned, or the like, and only after the appropriate payments have been made, the kiosk machine sends the scanned document to system 5 in FIG. 1 for processing, as described above.

In various embodiments, by a sender taking the action of sending a transmission through the embodiments described above, the sender agrees (via contract, subscription, or the like) to be billed for the transmission service. In such cases, language to this effect is explicitly stated on the template cover page. In another embodiment, a sender may be required to sign at a pre-determined location of the template cover page, or the transmission will not be provided. Appropriate optical detection techniques may be included in transmission server 5 to detect and to log a sender's signature. In some cases, if the signature were missing, an e-mail may be sent to the FROM: e-mail address indicating the problem. It is contemplated that the digitized representation of the document not be provided in such examples, to prevent fraud. In embodiments where signatures are required, appropriate contractual language may be explicitly stated on the template cover page next to the signature line.

In light of the embodiments above, where the user agrees to be billed for the transmission services, any number of methods may be used to settle the bill such as via direct billing, via third-party payment mechanism, or the like.

In some embodiments, tracking and/or billing for the services is based upon the transmission telephone number of the sender. In such cases, the sender may call-into a general fax number coupled to transmission server 5, a toll-free (e.g. 800, 888), or the like. In such embodiments, the sender's transmission telephone number is known and provided to transmission server 5, via Automatic Number Identification (ANI) service, or the like. In some cases, the sender's telephone number may be associated with a specific organization that has a direct billing relationship with transmission server 5. Accordingly, the specific organization may be directly billed for the service.

In some embodiments, the sender's telephone number is not associated with a specific organization and further, the template cover page includes language that the sender agrees to pay for the transmission. In various embodiments, the language on the template cover page may specify how the transmission is billed. In one embodiment, the user agrees to pay for the bill via their local telephone bill from which the sender is calling from. Such mechanisms are known as "casual billing" in the telephone industry. In another embodiment, the user agrees to pay for the bill via the ISP with whom they have an account. This data may be derived from the FROM: data field, illustrated in FIG. 10, or the like. For example, if FROM: field 440 specified: "CarolineCL@Earthlink.net," the ISP "Earthlink" may bill the sender through her monthly account.

In various embodiments, to reduce the possibility of fraud, an e-mail may be sent to the FROM: sender verifying that a transmission was sent, and that the ISP will be billed for the transmission. Embodiments may also require that the FROM: sender confirm a transmission via an e-mail message, before the transmission is provided to the TO: recipient. In still another embodiment, the sender may pay for a transmission via an on-line payment system, such as PayPal, Visa, or other payment system. Then, once PayPal, Visa, or the like notifies transmission server 5 that payment was received, the transmission may be provided.

In various embodiments, additional filled-in data fields or options may be provided on the template page to enable the user to enter billing information data, or third-party billing information mechanism. For example, in various embodiments, a user may enter a Federal Express, a UPS, a US Postal Service, a DHL, or the like account number, a PayPal or other electronic payment data, a Visa/MasterCard/Discover number or other credit card-related data, a prepaid telephone calling card account information, a stored value card, a checking, savings, or debit account number, a billing telephone number, and the like.

In some embodiments of the present invention, a "collect-on-delivery"-type (COD) payment mechanism may be implemented. In such cases, a sender may send an e-mail to a recipient, and the recipient is sent an e-mail notice from transmission server 5 that a transmission is waiting for them. To retrieve the transmission, the recipient may use any appropriate payment mechanisms, for example discussed above, such as direct billing, third-party billing, or the like. Such embodiments are envisioned useful for business travelers, or the like. As an example, a person may fax a copy of a document from on the road to her home office. Later, when she arrives back home, she opens the e-mail notice from transmission server 5, takes appropriate actions (e.g. provides account number and password), and then retrieves a copy of the transmission. Various embodiments including a As described earlier, some embodiments are based upon advertiser sponsorship. Such embodiments are based upon transmission data. For example, one embodiment detailed above included targeting geographically relevant advertising based upon area code of the telephone coupled to the transmission machine (e.g. fax machine, computer). Another embodiment is based upon targeting subject-matter relevant advertising based upon data optically character recognized from the transmission.

Figure 13:
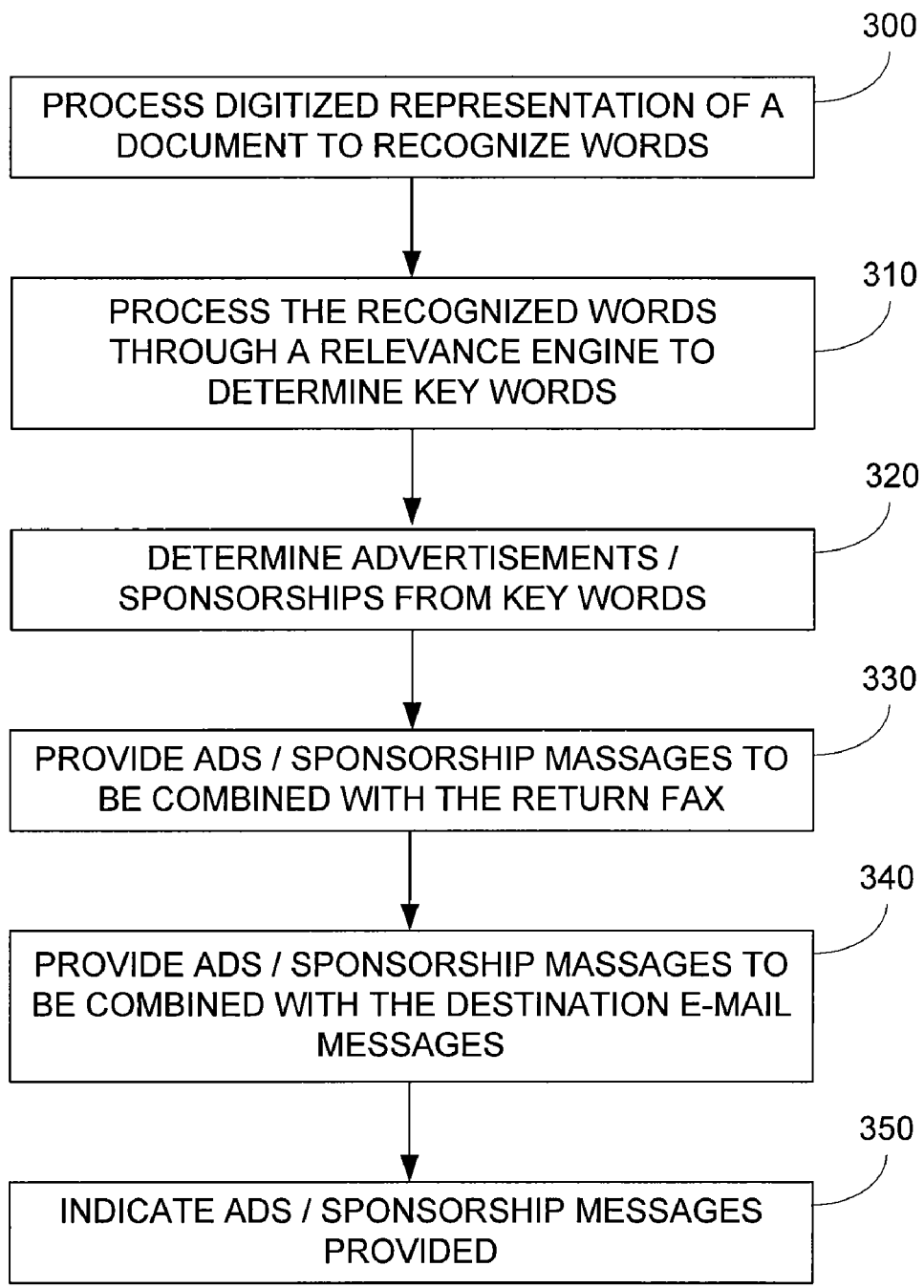
FIG. 13 illustrates a flow diagram according to an embodiment of the present invention.

FIG. 13 illustrates a flow diagram according to an embodiment of the present invention. More specifically, FIG. 13 includes additional detail of steps 54 and 56 in FIG. 3B, and/or steps 116 and 124 in FIGS. 8A and/or 8B.

Initially, the digitized representation of data (e.g. a document) is processed through an optical character recognition (OCR) engine, step 300. In various embodiments, the data (e.g. text) obtained in this step may also be used for archiving purposes, document indexing purposes, text searching purposes, compliance purposes, or other purpose previously described above. Accordingly, this step may or may not actually be part of steps 54, 56, or the like. In some embodiments, the OCR engine may include an automatic spell checker/spell correction functionality. As a result, the recognized words in the document are more likely to be correctly spelled. In various embodiments, the image of the document may be modified to indicate where text captured by the OCR is not spelled correctly, where the OCR could not recognize characters, or the like.

In various embodiments of the present invention, the recognized words in the document are then passed through a relevance engine, step 310. It is contemplated that the relevance engine may parse and process the recognized words in the document to semantically determine what the document is about, or the "relevance" of the document. In other words, the processing engine attempts to determine the subject matter of the document. As a first example, if the words "loan," "title," and "automobile" appear together frequently in a document, a relevance engine may conclude the document is related to an automobile loan; as a second example, if the words "loan," "title," and "property" appear together frequently in a document, a relevance engine may conclude the document is related to a mortgage; as a third example, if the words "loan," "title," and "property" do not appear together, but appear frequently in a document, and the terms "farmer" and "fertilizer" appear frequently, the relevance/advertisement engine/server may conclude the document is related to farming; and the like.

In various embodiments, recognized (key) words from a document may be passed from the OCR process to a relevance/advertisement server. For example, in some embodiments, the key words that are passed to the relevance/advertisement server, such as Google, Yahoo, e-Bay, MSN, A9, Lycos, Ask Jeeves, AOL, or the like, are simply a set of key words, or the like. Further, in return, what is returned from Google, or the like are one or more links, advertisements, messages, good/service listing, auction listing, search results, media, or the like, based upon the key words. Thus, as can be imagined, these and other types of search results, in response to the key words, can be provided in various embodiments of the present invention.

In some embodiments, the operator of the relevance/advertisement server (e.g. Google, or the like) does not know who the search is from. In such embodiments, user privacy is thus maintained. In other embodiments, a user may voluntarily identify themselves to the relevance/advertisement engine. For example, the user may include tracking information that the relevance/advertisement engine can identify, such as a user name. As examples, when a user lists their specific e-mail address or user name in a FROM: CC: field, or the like, the user name/e-mail address, or the like may be passed to the relevance engine such as A9.com, Google.com, Yahoo.com, or the like. In response, the relevance engine not only provides one or more advertisements, but maintains the search for the benefit of the user, e.g. A9, Google Desktop, and the like.

In various embodiments of the present invention, any number of semantic parsing, relevance/advertisement engines, or the like may be used to perform the above analysis. This may include publicly available and as proprietary engines used by Yahoo!, Microsoft Search, Google and Google Search, Excite, AskJeeves, and the like. Such engines are well-known to be able to determine metrics, such as one or more key search terms, to represent a document.

In some embodiments of the present invention, based upon the document metrics determined by the relevance engine, transmission server 5 determines one or more appropriate advertisements to include in the document transmission, step 320. Continuing the examples above, advertisements about car insurance, car accessories, car wash coupons, or the like may be identified for the first document; advertisements about moving companies, cleaning services, or the like may be identified for the second document; and advertisements about weather, farm equipment, or the like may be identified for the third document. Accordingly, the advertisements selected are typically highly relevant to the subject matter of the documents.

In various embodiments of the present invention, one or more advertisements that are selected are sent to the sender of the document, as already disclosed above, step 330. In various embodiments, the advertisements may be presented as a return fax, as illustrated in FIG. 6A; the advertisements may be presented in the body of the return e-mail message; the advertisements may be incorporated into the e-mail attachment; or the like. In various embodiments, one or more user-clickable links, or hypertext links may also be included. In various examples, the advertisement may a service mark, a banner-type ad, a watermark, a sponsorship logo, a frame, or the like.

In various embodiments, with the addition of click-through-type advertisements incorporated to the e-mail messages, revenue may be obtained. For example, revenue may be based upon number of impressions, number of click-throughs, number or amount of purchases resulting from click-throughs, and the like. Such revenue may be used to subsidize the service, enhance revenues, or the like.

In various embodiments of the present invention, one or more advertisements that are selected are also sent to the recipients of the document, such as the FROM: and CC: recipients, step 340. In various embodiments, the advertisements may be presented in a transmitted fax; the advertisements may be presented in the e-mail message; the advertisements may be incorporated into the e-mail attachment; or the like. Similar to above, in various embodiments, one or more user-clickable links, or hypertext links may also be included.

In some embodiments of the present invention, after the one or more advertisements have been provided, data is typically updated in advertisement statistics server 98, step 350.

Two-Sided Source Document and Large Source Document Transmissions

Most fax machines and scanners have the capability to digitize documents that have printing only on one side of the paper, i.e. are one-sided documents. However, transmitting two-sided documents from such fax machines or scanners has been a challenge. One method to transmit two-sided documents has been to initially transmit only even or only odd pages in a first transmission, and then to transmit the remaining even or odd pages in a second transmission.

One problem with this solution is that on the receiving end, the transmissions, must be manually combined by the receiving party. In other words, the receiving party is burdened with the task of tracking two separate transmissions and collating and interleaving the pages of the separate transmissions so that that pages of the source document are in the correct order. In an example, a first transmission may include odd pages 1, 3, 5, 9, etc. and a second transmission may include even pages 2, 4, 6, 8, etc. When the first and second transmissions are received, the recipient must manually assemble the two transmissions so that the pages are in order: 1, 2, 3, 4, etc. This is extremely time consuming, especially for large transmissions. Further, because it requires two or more separate transmissions, there is a greater chance that one of the transmissions will be delayed, lost or mis-routed, especially in a busy office environment.

Another method for transmitting two-sided documents has been for the sender to first copy the two-sided document onto single-sided paper, and then to fax the single-sided copy to the recipient.

A problem with this solution is that it requires the sender to make a separate copy of the document. For example, the sender must manually make a single-sided copy of the two-sided pages on a copier, or the sender must use a copier that can copy two-sided documents onto single-sided paper with a document feeder. However, because document feeder copiers are expensive to own or to lease, they are typically found only in office settings, and not at home offices. Accordingly, most users must manually make the single-sided copies. Other drawbacks include that making a separate single-sided copy of the document just for transmission (e.g. faxing) purposes is extremely wasteful of paper resources and is wasteful of copier resources.

Currently, only a small percentage of fax machines and scanners have the capability to digitize two-sided documents. The document feeders of such fax machines and scanners are typically expensive, and accordingly, such feeders are mostly found in office settings, and not at home offices.

In some embodiments of the present invention, the inventors propose novel methods for transmitting documents from two-sided source documents without the drawbacks described above.

In one embodiment, using the system described in the application incorporated by reference, a user opens a copy of the template page (a .pdf file) using Adobe Reader™ or Acrobat™ software or other appropriate software (e.g. Word, PowerPoint). In response the template page, such as that illustrated FIG. 11 is opened and displayed to the user.

In some embodiments of the present invention, the user has a two-sided document that they wish to transmit. To do so, the user first fills-in the appropriate data in fields 410-490. Next, the user manually selects option 550 on fax template page 400, and when ready, prints out the filled-in template page. This filled-in cover page is then placed as a cover-sheet on the odd-numbered pages (e.g. the front sides of the two-sided document.) The assembled pages are then transmitted to the transmission server as previously described above. In response, the transmission server acknowledges receipt of this first transmission, as also described above, with response fax, e-mail message, and the like.

In the present embodiments, while the template page is still open within Adobe Reader™ software, the user then manually selects option 560 on template page 400. By doing so, option 550 is automatically de-selected. In the various embodiments, the user then prints-out a copy of the filled-in template page for the remaining even pages. This filled-in cover page is then placed as a cover-sheet on the even-numbered pages (e.g. the back sides of the two-sided document.) The assembled pages are then transmitted (e.g. faxed) to the transmission server as previously described above. In response, the transmission server acknowledges receipt of this second transmission, with a response fax, e-mail message, and the like.

In some embodiments of the present invention, the odd page transmission may be sent before or after the even page transmission. In such embodiments, it is assumed that the odd page transmission includes the first page of the source document. In other embodiments, the first transmission sent is assumed to include the first page of the source document.

In other embodiments of the present invention, when either option 550 or option 560 are checked, two separate coverpages are automatically generated for the user: one cover page for odd page transmissions and one cover page for even page transmissions. In one embodiment, one cover page has option 550 already checked, and the other cover page has option 560 already checked. In alternative embodiments, two substantially similar cover pages are printed-out, and the user manually selects option 550 or option 560. In various embodiments, the user manually prints out each cover page, whereas in other embodiments, the pair of cover pages are printed-out in response to a single user print command.

In other embodiments, a single option may be provided instead of option 550 and option 560, as a fill-in option within the fax template page that indicates that the faxed document will transmitted as two separate fax transmissions. As described above, two separate cover pages may be automatically generated for the user to print out and use as cover pages when the single option was selected. In various embodiments, most of the user entered data will be the same for both separate cover pages. However, to differentiate between the cover pages, any type of visible notice or indicators may be included on the cover page that instructs the sender which cover page to use for even pages and which cover page for odd pages. For example, a "first" word may be stamped in a specific location on the first cover page, and a "second" word may be stamped in the same location, or different location on the second cover page, or the like. In various embodiments, the first cover page and the second cover page may look very different. For example, the first cover page may appear.

In specific examples of the present invention, a fax server receives a fax transmission, and determines that the transmission is a first half of a transmission, in response to data on the first cover page. In various embodiments, the fax server "reads" that option 550 is selected; the fax server "reads" text, such as "first" on the cover page; notices a mark at a predetermined location; or the like. After receiving the fax transmission, the fax server typically will not automatically send the transmission to the recognized TO e-mail address (or destination), unless requested. In various embodiments, the fax server automatically indicates success of the first fax transmission to the FROM e-mail address. In various embodiments, the fax server stores the fax transmission and awaits the second fax transmission.

Next, in such examples of the present invention, the fax server subsequently receives a second fax transmission, and determines that the transmission is the second half of a transmission. The fax server may determine this based upon identical filled-in data, such as the TO, FROM, SUBJECT fields, tracking number, and the like. The fax server may also determine this based upon data on the second cover page, such as recognizing that option 560 is selected, recognizing text, such as "second" on the cover page, or the like. After receiving the second fax transmission, the fax server typically does not automatically send the transmission to the recognized TO e-mail address (or destination), unless requested, however may send acknowledgement to the FROM e-mail address. Time window limitations may also be used in various embodiments so that two un-related documents from the same sender and to the same recipients are not unintentionally mixed. An example time window may be 24 hours, or the like.

In some embodiments of the present invention, once the transmission server determines that a pair of transmissions (e.g. even page transmission and odd page transmission) have been received, the transmission server combines the transmissions into a single transmission. In the example above, the fax server automatically interleaves odd-pages of the document from the first transmission with even-pages of the document from the second transmission. Accordingly, the assembled document includes a single (or both) cover page(s), then page one of the two-sided source document, page two of the two-sided source document, page three of the two-sided source document, and the like.

The assembled document may then be saved in a desired file format in various embodiments. For example, the assembled document can be stored as a single multi-page Adobe .pdf document, a single multi-page tiff document, or the like. In various embodiments, the assembled document is subsequently sent to the TO e-mail address (or destination), with appropriate copies to the carbon copy recipients, if any, and typically to the FROM e-mail address.

In other embodiments, other ways for combining data from multiple transmission are envisioned. For example, pages of multiple transmissions need not be fully interleaved or interleaved at all, and in another example the order for the multiple transmissions may be specified. Such embodiments are useful when source documents may be very long and unpractical to send as a single transmission. As an example, a first transmission may include part 1 of a 500 page article, a second transmission may include part 3 of the article, and a third transmission may include part 2 of the article. In such embodiments, a user may be prompted for the number of transmissions for the source document, on the template page. In response, these number of pages may automatically be generated as cover sheets for the respective transmissions. Based upon the data on the cover sheets, or the like, the receiving server (e.g. fax) can identify how the multi-part transmission should be reassembled. For example, the cover sheets indicate which transmission is to be the first, which is the second, and which is the third, in order.

In another embodiment of the present invention, in addition to automatically generated cover pages for multi-part transmissions, "chapter divider" pages may also be generated. Such chapter divider pages may be used to indicate places within a single transmission where there are logical divisions. These logical divisions may be used, as above, to indicate how multi-part transmissions, should be reconstructed in the fax server. As an example, a first transmission may include chapters 1, 3 and 4 of a book (using the chapter divider pages), and a second transmission may include chapters 2, 5 and 6 of a book (also using the chapter divider pages.) In various embodiments, the user may indicate via markings on the cover pages or the chapter divider pages, how the "chapters" of the transmissions are to be reassembled. Referring to such markings, in one example, the fax server combines the transmissions and creates a single transmission with chapters 1-6 in order. In other embodiments, many other ways to group pages between separate transmissions are contemplated of the present invention.

According to the embodiments described in the above-mentioned application, the combined transmission may then be converted into one or more data file in a data storage formats, such as Adobe .pdf-compatible, TIFF, JPEG, BMP, X-Docs, XML, .tiff, operating system-specific data storage formats, operating system-independent data storage formats, or the like.

Next, based upon the data "recognized" from the cover page, the transmission server (e.g. fax server) determines transmission information for the data file. In various embodiments, as described above, the transmission information may include an e-mail address for a receiver, a socket for a server on a computer network, a hyperlink for the receiver to click upon to access the data file, a receiver account number, or the like. In some embodiments of the present invention, based upon the routing information, the transmission server also determines an appropriate network transfer protocol for the data file. In various embodiments described above, the network transfer protocol is SMTP when the routing information is an e-mail address. In other embodiments, other types of network transfer protocols may be used including HTTPS, FTP, HTTP, or the like.

In some embodiments of the present invention, the server then sends the data file out according to the routing information, using the appropriate network transfer protocol.

Tracking Data

As illustrated in FIG. 11, tracking number 580 may be provided on cover pages. Tracking number 580 may be generated at the time the user prints-out the filled-in template page, or when the template page is received by the transmission receiver/server, or the like. In various embodiments, tracking number 580 may be reproduced on the filled-in template page, sent in a confirmation e-mail to the sender or receiver, or the like. In various embodiments, tracking number 580 may include virtually any alphanumeric character, or the like.

In various embodiments, the tracking number may be based upon data filled-in by the user, based upon user data, based upon the time and date, media access controller (MAC) address, and the like. In various embodiments, based upon such data, a hash, or other method for generating unique tracking numbers are contemplated.

In operation of specific embodiments, if a tracking number is assigned on the sender system, when the transmission server (e.g. fax server) receives the transmission (e.g. fax transmission), the transmission server performs optical character recognition to recognize the tracking number. In various embodiments, the tracking number may appear at a specific predetermined location on the filled-in cover page, or any other location. In the various embodiments, the tracking number is also recognized using OCR techniques. The tracking number is then associated with the entire facsimile transmission.

In some embodiments of the present invention, as the transmission server processes the transmission, a log is generated which indicates the status of the transmission within the transmission server. For example, in various embodiments, the types of data that the transmission server stores may include: number of pages currently received by the transmission server (e.g. fax server), the status of the transmission (e.g. fax received?), the total number of pages received, the resolution of the transmission (e.g. 400 dpi), the recognized TO, FROM, BCC, and CC e-mail addresses, if any, the recognized file names, the data file format (e.g. .pdf, .jpg, XML, etc.), the status of converting the transmission into the data file format, the network transfer protocol (e.g. SMTP, HTTP, HTTPS, FTP, etc.), the status for sending the data file (e.g. e-mail accepted by e-mail server at x time, e-mail bounced by e-mail server, e-mail reported as SPAM, etc.), whether a transmission was approved or denied, whether a user opened the transmission in the data file format, whether a user requested the data file in a certified delivery system, and the like. Many other types of status and information can be logged in other embodiments of the present invention. In some embodiments, the type and/or amount of tracking data available to a requester may be restricted.

In various embodiments, the sender of a transmission may request information regarding the fax transmission via e-mail, IM, or the like, by submitting the tracking number to the transmission server. In response, the requested status information is provided back to the requester. In other embodiments, at various stages in the transmission process, status reports may automatically be provided to the sender, for example, an e-mail with the information may be provided to the sender.

In other embodiments of the present invention, the tracking number is generated by the transmission server as it processes the transmission to determine the transmission data. The generated tracking number is then provided back to the original sender of the fax. As above, the sender may then request status information regarding the transmission to the transmission server based upon the tracking number such as when an e-mail was sent to the recipient, or the like.

OCR Improvements

Optical character recognition (OCR) of human-readable data (e.g. hand printing), as well as machine-readable data (e.g. barcodes, MICR fonts) addresses, and the like have been successful for recognizing filled-in data for transmission cover sheets. Problems arise, however, when the OCR subsystem has difficulty recognizing the sender-entered data. Typical reasons why the OCR may have difficultly recognizing may include improperly printed characters, misaligned and/or rotated fax pages, noisy transmissions, and the like. Accordingly, the inventors have recognized that additional ways to strengthen the recognition of sender-entered data is desired.

In the example in FIG. 11, sender-entered data displayed and represented at more than one location of the cover page to improve the OCR recognition process. More specifically, as illustrated in FIG. 11, To field 410, Carbon copy field 420, blind carbon copy field 430, from field 440, subject field 450, filename specification field 460, and custom fields 470 and 480 are provided. Additionally, bar codes 590 and 600 are also provided. In various embodiments, bar codes 590 and 600 may include the identical data, or different data.

In some embodiments of the present invention, it is contemplated that template 400 will be printed-out from within Adobe Reader™ software, an Office productivity program (e.g. Word), or the like, after having these fields filled-in by the sender. In such embodiments, fonts for human-readable characters in fields 410-480 may be output in a font style more conducive to OCR techniques, such as MICR E-43B, CMC-7, and the like.

Figure 12:
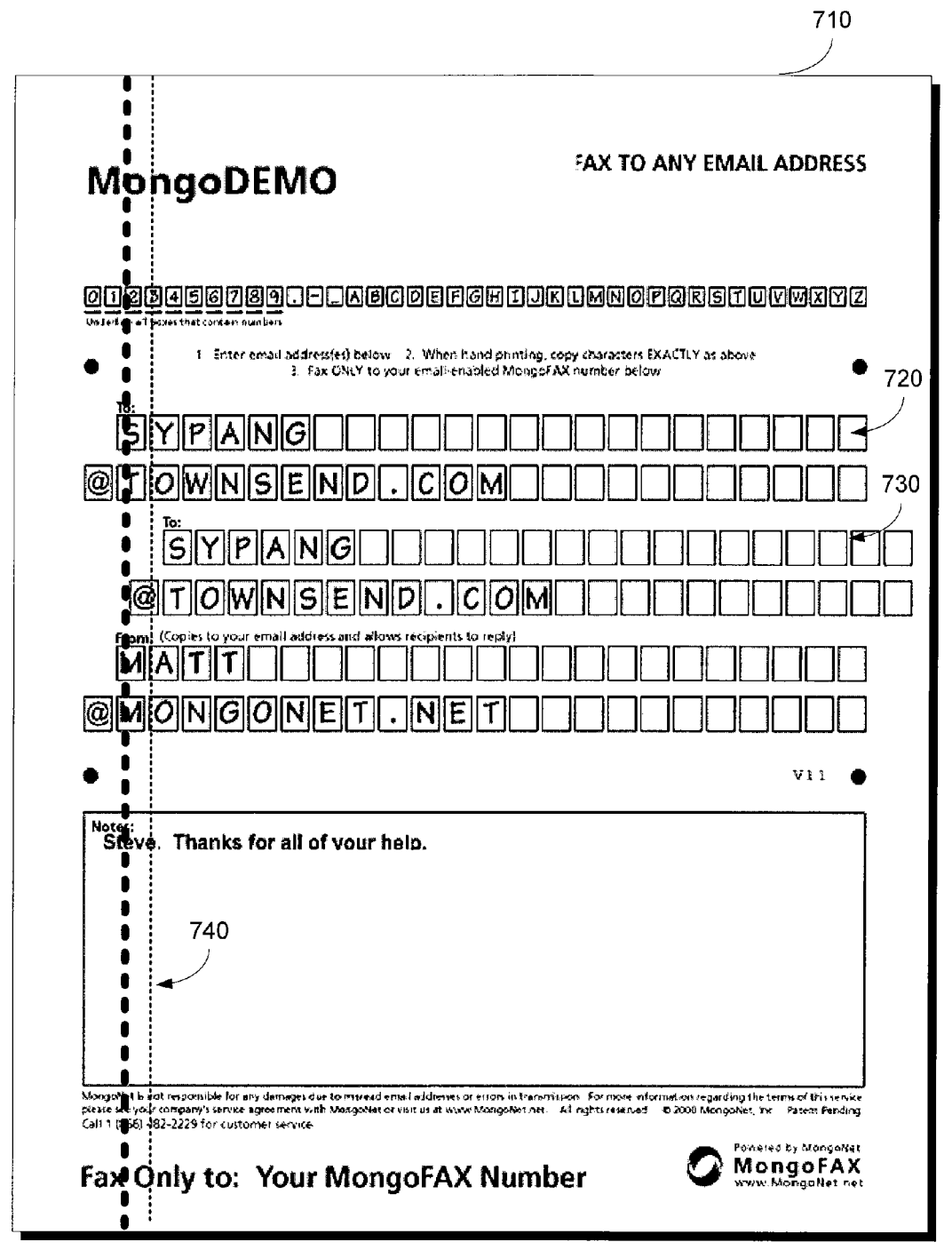

FIG. 12 illustrates a example of another embodiment of the present invention. More specifically, a portion of a printed-out template page 710 is illustrated. As can be seen, fields 720 and 730 may include the same data, and are not aligned on the page. By positioning fields 720 and 730 out of phase, vertical streaks 740, which are often present of fax transmissions, tend not to obscure the same portion of fields 720 and 730. Accordingly, the chance of recognizable data being transmitted for both fields 720 and 730 are higher.

In some embodiments of the present invention, various types of syntax checking may be performed before the filled-in cover page is printed-out. For example, for e-mail addresses, an appropriate top-level domain suffix (.com, .net, .gov, .biz, .org, etc.) may be checked and flagged if there is an error. As an example, if a user enters "apple@aol.con," a message may be presented to the user, indicating that the top-level domain suffix does not exist.

Additionally, in other embodiments, syntax checking may be based upon the domain name (e.g. aol.com, mit.edu) entered. In such embodiments, the validity of the domain name may be validated before the cover page is printed-out. As an example, if the user enters a domain name such as "fotmail.com" the system may access the internet to perform a domain name look-up. In this example, if "fotmail.com" does not resolve to a server, a message may be presented to the user, indicating that the domain name does not exist. Alternatively, "fotmail.com" may be automatically corrected to "hotmail.com." In other embodiments, dictionaries, or other sources of common names may be the basis of other automatic corrections.

Other types of syntax checking may also be performed in other embodiments, such as checking the e-mail addresses of the filled-in fields to the sender's address book, or the like. In various embodiments, the syntax checking functionality catches potential errors before the document is transmitted to the transmission server.

In other embodiments of the present, the transmission server may perform syntax checking, described above, based upon the optical character recognition results, instead of the sending system. For example, if the OCR results read "aol.con," or "mit.com" several options are available. In some embodiments, the transmission server may automatically determine a best guess based upon syntax. As an example, a fax server may change "aol.con" into "aol.com" and/or "mit.com" to "mit.edu." In other examples, correction of data, such as e-mail addresses may be based on part of prior history of the sender. For example, if a sender has previously sent many transmissions to "davidcl@mid.edu," but for a present transmission, the OCR system recognizes "qavidcl@mid.edu," the transmission server may automatically correct it to read "davidcl@mid.edu." In various embodiments, the sender may be recognized by a telephone number which the sender calls-into, based upon the FROM e-mail address, a telephone number of the sender's fax machine, and the like. In other embodiments, automatic correction may be made based upon e-mail addresses or like for an organization a sender is associated with, or the like.

In some embodiments, the transmission server may highlight the syntax problems to an operator at the transmission server. In response, the operator may decide whether the proposed correction should be used or not. In various embodiments, as discussed above, only the user-entered address fields illustrated in FIG. 11 are displayed to an operator. Additionally, the remaining portions of the cover page, including notes field 490 remains unavailable for operator review. Similarly, the operator does not have access to any other part of the transmission, or any other page of the fax transmission. Using template pages with additional OCR targets is believed to increase the accuracy of the transmissions, without sacrificing the high level of security and confidentiality already provided by embodiments of the present invention.

In other embodiments of the present invention, an "address" book based upon prior transmissions by the sender may be maintained by the transmission server, or the like. In cases where there is a syntax error, the transmission server may automatically determine if there is a best guess, and send the fax to that guess. In other embodiments, the transmission server may alternatively output the syntax error to an operator.

In still other embodiments, if there is a syntax error, the transmission server may automatically contact the sender via e-mail, instant messenger, or the like, and indicate the syntax error, or the like. In such embodiments, the sender may be invited to provide the corrected data by return communication. In some embodiments, the transmission server may automatically determine the corrected data from the sender and proceed based upon the corrected data. In other embodiments, an operator may review the corrected data from the sender, and make the correction, if appropriate.

The above syntax checking and syntax error reporting and handling may also be uses to notify a sender of delivery failure errors for bounced e-mail messages, or the like.

Additional OCR Enhancements

In the embodiment illustrated in FIG. 11, barcodes 590 and 600 are included into fax template page 400. In various embodiments, barcodes 590 and 600 provide OCR targets for the transmission server, in addition to fields 410-490. In the embodiments illustrated, fields 410-490 are typically human-readable and machine-readable, however barcodes 590 and 600 are typically only machine-readable.

In various embodiments, the printed characters in fields 410-490 are recognized using optical character recognition of the text characters. In other embodiments, other language text characters may be supported by OCR techniques geared towards such languages. Additionally, barcodes 590 and 600 are typically independently recognized using OCR of the bar codes. In some embodiments of the present invention, the recognized data from the three OCR targets must match to a high degree of confidence before the recognized data is used by the transmission server. In other embodiments, candidate data recognized by two out of three OCR targets must substantially match before the recognized data is used by the transmission server. In still other embodiments, if option 570 is selected, the OCR targets may be ignored, and fields 410-480 are used.

In some embodiments of the present invention, the data encoded in barcodes 590 and 600 include only a subset of data in fields 410-480, for example, barcodes 590 and 600 may include only field 410 data and field 440 data; only field 410 data, field 420 data, field 440 data; fields 410-450 data; or the like. In other embodiments, other combinations or subsets of fields 410-480 are envisioned. In still other embodiments, the same data may be encoded to barcodes 590 and 600, or different data may be encoded to barcodes 590 and 600. For example, in one embodiment, both barcodes 590 and 600 include data from fields 410-420, data from fields 410-450, or the like. As additional examples, barcode 590 includes data from field 440, but not data from field 430, whereas barcode 600 includes data from field 430 but not data from field 440. In cases where data is unique to barcode 590 or 600, it is contemplated that two out of two OCR engines (e.g. fields 410-480 OCR, and barcode OCR) return candidate data that must substantially agree upon, otherwise an error is identified. Other types of examples can be envisioned.

In still other embodiments of the present invention, barcodes 590 and 600 may include check-sum, or hashed data based upon data from one or more fields 410-490.

In operation, before the filled-in cover page is printed-out, the filled-in data, and/or a hash of the filled-in data, or the like, is encoded into a bar-code format. The bar codes are then typically written into different orientations in barcode 590 and barcode 600, in FIG. 11.

In various embodiments of the present invention, the fonts appearing as text within fields 410-490, as well as the barcode fonts may be included in a template .pdf file. To do so, in various embodiments, copyrights to the included fonts must be obtained, and a flag must be set within the font library embedded within the .pdf file that includes the copyright status of the fonts.

Next, when the transmission server receives the filled-in cover page, separate OCR engines are used to recognize the filled-in data in fields 410-490, and barcode 590 and 600. In one embodiment, if the recognized data from two or three of the OCR engines substantially match, the transmission server processes the transmission using the recognized data. In another embodiment, if a hash of the data in fields 400-490 substantially match the data encoded in barcode 590 and/or 600, the transmission server processes the transmission using the recognized data. In case where the data do not match, the sender may be notified of the error and requested to correct the error, as described above. Also, an operator may be notified of the error and requested to intervene in the transmission process.

Other Enhancements

FIG. 11 identified additional functionality that may be enabled by the transmission server. In some embodiments of the present invention, when a sender selects field 500, the transmission server may use an optical character recognition engine to recognize the text in some/all of the pages of the received transmission. In one embodiment, the recognized text is combined with the images of the sent transmission in an Adobe .pdf file. In other embodiments, the recognized text may be provided as a .txt, .rtf, .doc file, or the like, along with the transmission to the recipient.

In some embodiments of the present invention, when a sender selects field 520, the transmission server may initiate an e-mail certification process whereby certification of when an e-mail message, or the like is delivered to the recipient, when the e-mail message is opened by the recipient, and the like. In such embodiments the original transmission is typically stays resident upon the transmission server. Additionally, the recipient receives notification that a transmission has arrived for the recipient in the form of an e-mail, page, cell-phone call, or the like. In response, the recipient logs-into the transmission server with a password to retrieve the transmission. In such embodiments, when the recipient receives the transmission time is recorded.

In some embodiments of the present invention, when a sender selects field 530, the transmission server may provide an electronic post-mark receipt. In some embodiments of the present invention, it is envisioned that an official US Postal Service electronic post-mark stamp may be associated with fax transmissions. This provides several benefits, including officially certifiable electronic delivery of fax transmission data between parties, including certification of dates and delivery of data, and the like. In such embodiments, an inbound and/or outbound transmissions may be hashed, and the hash then sent to a certifying authority. In various embodiments, hash algorithms may be used that uniquely calculate a value based upon the transmission, such as MD(5) or the like. In response to the hash, a US Postal service electronic post-mark, or any other certifying authority mark, records the hash, as well as the time and data into the certifying authority database. It is envisioned that such certifications could be used to prove the sending or delivery of the transmission.

In still some embodiments of the present invention, when a sender selects field 540, the transmission server may perform an additional action of affixing a digital watermark, or the like to the transmission. In various embodiments, the digital watermark may utilize electronic watermarks onto .pdf, .tiff, .gif, .doc documents, or others. In other embodiments, the digital watermark may include determining a unique hash or identifier for a transmission, and providing the hash or identifier as part of the fax transmission, or in a follow-up transmission, or the like. Many other methods for watermarking are also contemplated.

In additional embodiments of the present invention, additional functionality buttons for a template cover page may be displayed on the display. For example, in one embodiment, a "problem" or "trouble" button is provided. It various embodiments, if a user selects the "problem" button, the user is coupled, for example, via a launched browser, to a service page. In some embodiments, the version number of the template page, version number of the software (e.g. Adobe Reader), and the like may be automatically sent, for remote problem diagnoses. In some embodiments, in response to the diagnoses, a patch may be provided to the user, an updated template page may be provided to the user, the user may be provided with a link to an upgrade page, and the like.

In other embodiments of the present invention, for upgrading purposes, updates to the template page are checked when the user opens the template page. In cases where there is an update available, the user may be presented with the option to update the template page and software. In various embodiments, appropriate telephone numbers and passwords may be required from the user prior to an update being provided to the user.

In other embodiments of the present invention, when a sender sends a fax, as part of the copy of the transmission the sender receives, an updated template page may automatically be provided. Accordingly, users are automatically updated when they use the transmission service.

In some embodiments of the present invention, when a sender selects field 510, the transmission server may perform an additional action of sending the data to an archival system. In various embodiments, the archival system may be associated with the transmission server, with the sender, with a third-party server, or the like. Typically, status information associated with the transmission to the receiving party may also be sent to the archival system. In various embodiments, various methods for generating archival indexing terms may be used, including based upon send date, sender, receiver, and the like. In such embodiments, the source document may be faxed, may be scanned, may be electronically "printed" or the like to the transmission server. In some embodiments, transmissions from users may be from fax machines, scanners, multi-function machines, print-to-file computer output, and the like. In such embodiments, fields on the transmission cover sheet, such as fields 450-490, may be used for the sender to identify keywords useful for indexing the transmission in the data archive.

In various embodiments, the cover page may be application, specific, and provide drop-down boxes to the sender for fields 410-490, limiting the senders' options. As examples, field 470 may be used to specify certain types of SEC filings, such as 10Q, 8K, or the like; field 410 may be used to specify between a limited number of data archives, such as "tax return form," "trust request form," and the like; field 480 may be used to specify a scanning resolution, such as 200 dpi, 300 dpi, 72 dpi, and the like.

Additionally, fields such as fields 410-440 may specify the appropriate data archive. The data archive may include a storage area network, or other data store. In various embodiments, such embodiments, the transmission server processes the transmission from the sender, and sends the transmission to the data archive.

As an example, a sender specifies on the transmission cover-page that a document is to be sent to a tax data archive via field 410 or option 510. Additionally, the sender also specifies the tax payer ID in field 470, and tax form on field 450. As discussed above, option 500 may also be checked to make the contents searchable.

In one embodiment, once the transmission cover page has been filled-in, the sender prints-out the cover-page. Next, the sender assembles the cover page and the document, and then transmits (e.g. faxes) it to a pre-specified telephone number. In various embodiments, the transmission server then receives the cover page, and then based upon OCR techniques determines that the attached document is to be stored in the specified tax data archive. The attached document is also OCRed according to option 500. The attached document may then be transformed into another format, such as .pdf, tiff, or the like. The document, or the transformed document, and the OCRed text, and keywords are then provided to the tax data archive. In this example, the server associated with the data archive receives the keywords, and stores the document, or transformed document, along with the OCRed text, according to the keywords.

In another embodiment, the transmission may be placed into a holding server, and only when the transmission is authorized, is the transmission input into the data archive. For example, in one embodiment, a compliance officer, or the like approves the transmission, before the transmission is stored in the data archive. In another example, a sender reviews the keyword data, and other portions of the transmission, before the sender authorizes the storage of the transmission. In still other embodiments, when the sender reviews the transmission, the sender enters the keywords, and then approves the transmission.

In other embodiments of the present invention, the sender interface, described above may be web-based. For example, the user, via a web browser, or the like, connects to a web page which prompts her for data possibly similar top fields 410-490 and options 500-570. The web page may be a web-based form. In some embodiments of the present invention, the user may type data into fields, or select entries, based upon drop-down boxes, as discussed above.

In various embodiments, based upon the form data, a template cover page is prepared for the sender to print out. In some embodiments of the present invention, the cover page may be a .pdf, .gif, .tiff, .doc, or any other printable format, for transmission, as discussed above. Additionally, for multiple transmission documents, multiple cover pages may be provided, for transmission purposes, as discussed above.

In some embodiments of the present invention, the web server providing the web form may provide a number of functions prior to providing the printable cover page. As an example, the web server may automatically perform context checking of the sender entered data. For example, as described above, entries with incorrect top level domain names, would be flagged as incorrect to the sender, and the cover page would not be provided. As another example, the web server may store the sender-entered data or provide this data to the transmission server. Subsequently, when the sender send the transmission to the transmission server, the transmission server uses OCR to attempt to recognize the user filled-in data. However, if there is an ambiguity in the OCR process, the transmission server cross-references the previously sender-entered data, to determine the intended data. In other embodiments, a special mark may be provided on the cover-page indicating that the transmission included data that was previously provide to the transmission server (e.g. via the web form). In such examples, the transmission server may perform sufficient OCRing of the cover page to uniquely identify the sender-entered data previously stored. Next, the transmission server may use the sender-entered data for transmission purposes.

Various embodiments, may include some, but not necessarily all of the features describe above. For example, one embodiment may allow digitized documents to be converted only to .pdf, or .tiff format and sent only to e-mail addresses. Other embodiments may allow digitized documents to be converted into another file format, and be placed in a storage location. In such embodiments, an e-mail would be sent to a recipient including instructions to access the converted document at the storage location. Such embodiments allow tracking of receipt by the recipient. Another embodiment may redirect outbound digitized documents from specified senders to a centralized queue for compliance purposes. In response, if a compliance officer approves the transmission, the digitized document may again be converted into another file format, and then sent via e-mail to an e-mail address. Yet another embodiment may allow for distributed archiving and indexing of digitized documents. For example, outbound transmissions are placed in a queue for indexing purposes. In response, a sender manually provides indexing key words for the digitized document. Once the index words are determined, the digitized document and key words are provided to an archiving system.

In additional embodiments of the present invention, in addition to a transmission sent to the recipient including the digitized document, the transmission may include a return fax coversheet. This option may be specified by an option box on the coversheet, or the like. This fax coversheet may be pre-filled-out with data from the "from" e-mail address and "to" e-mail address automatically switched. In this way, the receiver can easily send a return transmission to the sender. For example, a loan officer may send documents for a applicant to sign, and the digitized documents come to the applicant's e-mail box as a .pdf document. Along with the e-mail is a filled-in return fax coversheet. In this example, the applicant prints out and signs the documents, places the filled-in return fax coversheet on the signed documents, and faxes it to the number listed on the filled-in return fax coversheet. The signed document is then converted to a .pdf document, or the like, and sent to the loan officer's e-mail box. In various examples, the loan officer can pay for the cost of both transmissions. In other embodiments, a generic blank coversheet may be provided to the recipient.

Many changes or modifications are readily envisioned. In light of the above disclosure, one of ordinary skill in the art would recognize that many variations may be implemented based upon the discussed embodiments. For example, in various embodiments described above, the e-mail attachment was converted into the Adobe .pdf file format, however, it should be understood that in other embodiments, different "industry standard" file formats currently developed, or developed in the future may also be used. These may also include "open" or "closed" (e.g. proprietary) document formats.

Figure 14:
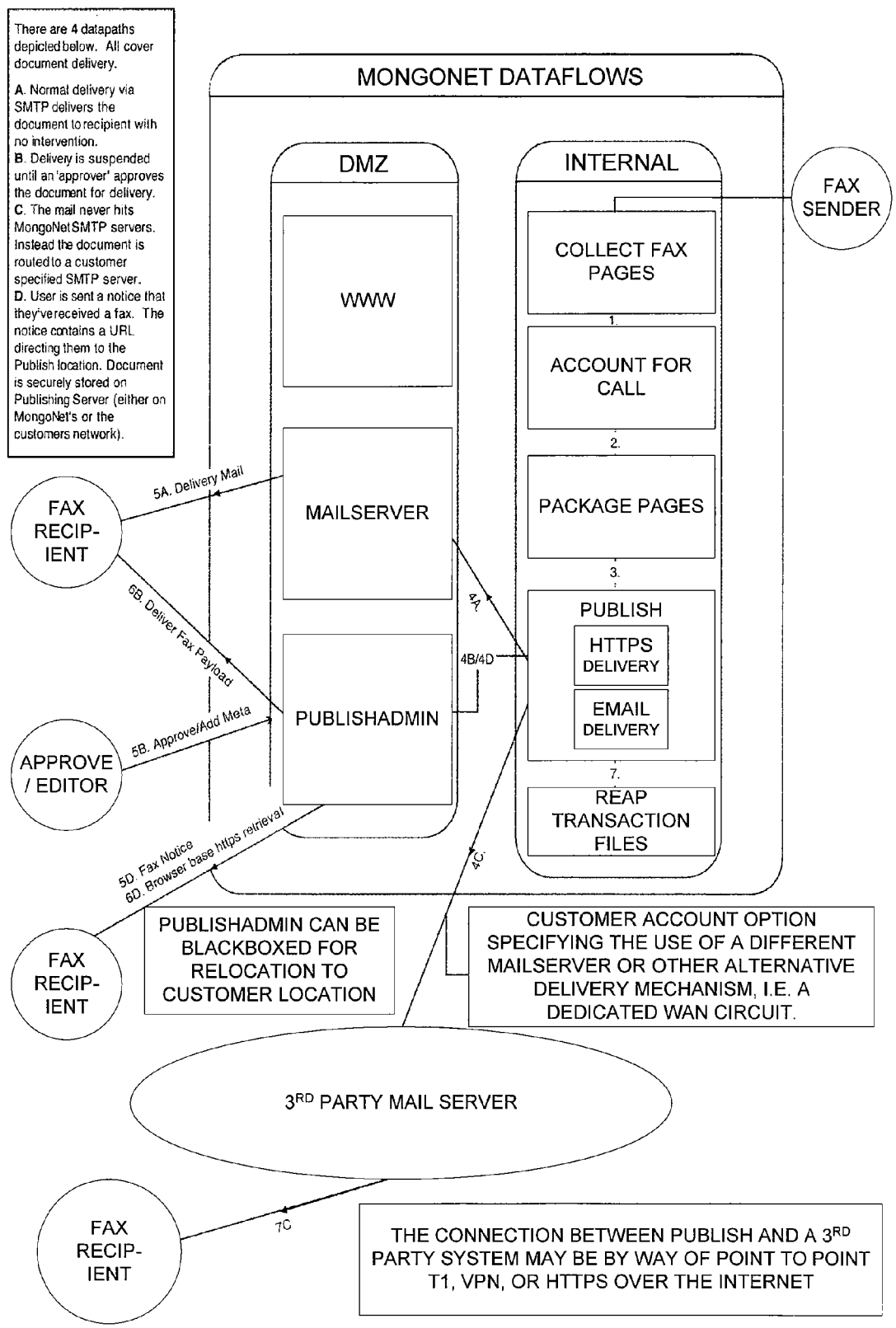
FIG. 14 is a simplified block diagram illustrating potential dataflows according to embodiments of the present invention.

FIG. 14 is a simplified block diagram illustrating potential dataflows discussed above, according to embodiments of the present invention. Many other types of dataflows are also envisioned, as discussed above. FIG. 15 is a simplified block diagram illustrating a network architecture overview according to embodiments of the present invention. Many other types of network architecture may be used in other embodiments of the present invention.

Further embodiments can be envisioned to one of ordinary skill in the art after reading this disclosure. In other embodiments, combinations or sub-combinations of the above disclosed invention can be advantageously made. The embodiments are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system comprises:
   receiving a facsimile transmission from a user in a fax server, wherein the facsimile transmission includes a digitized representation of a document transmitted using a facsimile transmission format;
   processing the digitized representation of the document to determine a destination e-mail address using the fax server comprising:
      processing a first portion of the digitized representation of the document with an optical character recognition engine to determine a first candidate e-mail address using the fax server;
      processing a second portion of the digitized representation of the document with an optical character recognition engine to determine a second candidate e-mail address using the fax server; and
      determining the destination e-mail address in response to the first candidate e-mail address and to the second candidate e-mail address using the fax server;
   reformatting at least a portion of the digitized representation of the document into an e-mail attachment format using the fax server;
   determining advertisement data associated with the facsimile transmission using a third-party advertisement server comprising:
      processing at least a portion of the digitized representation of the document with an optical character recognition engine to determine one or more key words using the fax server;
      providing the one or more key words to the advertisement server; and
      receiving the advertisement data from the advertisement server, wherein the advertisement data includes one or more advertisements selected from a group consisting of: hyperlink, listing of at least one auction, search results; and
   forming an e-mail message addressed to the destination e-mail address using the fax server and an e-mail server, wherein the e-mail message includes a body portion and an attachment portion, wherein the body portion includes the advertisement data, and wherein the attachment portion includes the portion of the digitized representation of the document in the e-mail attachment format.

2. The method of claim 1 wherein determining the advertisement data associated with the facsimile transmission comprises:
   determining an area code associated with a facsimile machine that provides the facsimile transmission; and
   determining the advertisement data in response to the area code using the advertisement server.

3. The method of claim 1 wherein the e-mail attachment format is selected from a group of data file formats consisting of: pdf-compatible.

4. The method of claim 1 wherein the third-party advertisement server comprises a third-party search engine.

5. The method of claim 4 wherein the advertisement data are topically related to a topic associated with the one or more key words.

6. The method of claim 1 further comprising
   determining a tracking number associated with the facsimile transmission;
   maintaining processing status associated with the facsimile transmission;
   forming an association between the tracking number and the processing status;
   storing the association between the tracking number and the processing status;
   receiving the tracking number from a user via a web page; and
   providing the processing status to the user in response to the tracking number.

7. A computer system comprises:
   a memory configured to store a facsimile transmission from a user, wherein the facsimile transmission includes a digitized representation of a document transmitted using a facsimile transmission format; and
   a processor coupled to the memory, wherein the processor is configured to process the digitized representation of the document to determine at least one destination e-mail address, wherein the processor is configured to reformat at least a portion of the digitized representation of the document into an e-mail attachment format, wherein the processor is configured to determine advertisement data associated with the facsimile transmission, and wherein the processor is configure to form an e-mail message addressed to the destination e-mail address;
   wherein the e-mail message includes a body portion and an attachment portion, wherein the body portion includes the advertisement data, and wherein the attachment portion includes the portion of the digitized representation of the document in the e-mail attachment format;
   wherein the processor is configured to process at least a portion of the digitized representation of the document with an optical character recognition engine to determine one or more key words;
   wherein the processor is configured to provide the one or more key words to an advertisement server;
   wherein the processor is configured to receive the advertisement data from the advertisement server;
   wherein the advertisement data includes one or more advertisements selected from a group consisting of: hyperlink, listing of at least one auction, search results;
   wherein the processor is also configured to process a first portion of the digitized representation of the document with an optical character recognition engine to determine a first candidate e-mail address;
   wherein the processor is configured to process a second portion of the digitized representation of the document with the optical character recognition engine to determine a second candidate e-mail address; and
   wherein the processor is configured to determine the destination e-mail address in response to the first candidate e-mail address and to the second candidate e-mail address.

8. The computer system of claim 7 wherein the advertisement data associated with the facsimile transmission comprises determining at least an area code associated with a facsimile transmission device providing the facsimile transmission.

9. The computer system of claim 7 wherein the advertisement server comprises a third-party server.

10. The computer system of claim 9 wherein the third-party server is selected from a group consisting of: Google server, Yahoo! server, e-Bay server, Microsoft Network server, A9 server, Lycos server, Ask Jeeves server, AOL server.

11. The computer system of claim 9 wherein the e-mail attachment format is selected from a group of data file formats consisting of: pdf-compatible.

12. The computer system of claim 7 wherein the third-party server comprises a third-party search engine.

13. The computer system of claim 7
wherein the processor is also configured to determine a tracking number associated with the facsimile transmission;
wherein the processor is also configured to maintain processing status associated with the facsimile transmission;
wherein the processor is also configured to maintain an association between the tracking number and the processing status ;
wherein the processor is configured to receive the tracking number from a user via a web page; and
wherein the processor is configured to provide the processing status to the user in response to the tracking number.

14. A computer program product for a computer system including a processor includes:
a tangible media configured to store:
code that directs the processor to receive a facsimile transmission from a user, wherein the facsimile transmission includes a digitized representation of a document transmitted using a facsimile transmission format;
code that directs the processor to process the digitized representation of the document to determine a destination e-mail address;
code that directs the processor to format at least a portion of the digitized representation of the document into an e-mail attachment format;
code that directs the processor to determining advertisement data associated with the facsimile transmission comprising:
code that directs the processor to process at least a portion of the digitized representation of the document with an optical character recognition engine to determine one or more key words;
code that directs the processor to provide the one or more key words to an advertisement server; and
code that directs the processor to receive the advertisement data from the advertisement server;
code that directs the processor to form an e-mail message addressed to the destination e-mail address, wherein the e-mail message includes a body portion and an attachment portion, wherein the body portion includes the advertisement data, and wherein the attachment portion includes the portion of the digitized representation of the document in the e-mail attachment format,
code that directs the processor to determine a tracking number associated with the facsimile transmission;
code that directs the processor to maintain processing status associated with the facsimile transmission;
code that directs the processor to form an association between the tracking number and the processing status;
code that directs the processor to storing the association between the tracking number and the processing status in the tangible memory;
code that directs the processor to receive the tracking number from a user via a web site; and
code that directs the processor to provide the processing status to the user via the web site, in response to the tracking number.

15. The computer program product of claim 14
code that directs the processor to determine the advertisement data associated with the facsimile transmission comprises code that directs the processor to determine an area code associated with a facsimile machine that provides the facsimile transmission.

16. The computer program product of claim 14 wherein the advertisement server comprises a third-party relevance engine associated with a third-party.

17. The computer program product of claim 16 wherein the third-party is selected from a group consisting of: MSN, Yahoo!, Lycos, AOL, Google, A9, e-Bay, Ask Jeeves, and Dog Pile.

18. The computer program product of claim 16 wherein the advertisement data includes one or more results selected from a group consisting of: hyperlink, sponsorship notice, listing of at least one service provider, listing of at least one good provider, listing of at least one auction, search results, textual data, and graphical data.

19. The computer program product of claim 16 wherein the advertisement data are topically related to a topic associated with the one or more key words.

20. The computer program product of claim 14 further comprising code that directs the processor to provide an e-mail address associated with the user to the advertisement server.

21. The computer program product of claim 20 further comprising
code that directs the processor to process the digitized representation of the document to determine the e-mail address associated with the user.

22. A method for a computer system comprising:
receiving a facsimile transmission from a user in a fax server, wherein the facsimile transmission includes a digitized representation of a document transmitted using a facsimile transmission format;
processing the digitized representation of the document to determine a destination e-mail address using the fax server;
reformatting at least a portion of the digitized representation of the document into an e-mail attachment format using the fax server;
determining advertisement data associated with the facsimile transmission using a third-party advertisement server;
determining advertisement data associated with the facsimile transmission using third-party advertisement server comprising:
processing at least a portion of the digitized representation of the document with an optical character recognition engine to determine one or more key words using the fax server;
providing the one or more key words to the advertisement server; and
receiving the advertisement data from the advertisement server,
forming an e-mail message addressed to the destination e-mail address using the fax server and an e-mail server, wherein the e-mail message includes a body portion and an attachment portion, wherein the body portion includes the advertisement data, and wherein the attachment portion includes the portion of the digitized representation of the document in the e-mail attachment format; and determining a tracking number associated with the facsimile transmission;
maintaining processing status associated with the facsimile transmission;
forming an association between the tracking number and the processing status;
storing the association between the tracking number and the processing status;
receiving the tracking number from a user via a web page; and
providing the processing status to the user in response to the tracking number.

23. The method of claim 22 wherein determining the advertisement data associated with the facsimile transmission comprises:
determining an area code associated with a facsimile machine that provides the facsimile transmission; and
determining the advertisement data in response to the area code using the advertisement server.

24. The method of claim 22 wherein the advertisement data includes one or more advertisements selected from a group consisting of: hyperlink, listing of at least one auction, search results.

25. The method of claim 22 wherein the e-mail attachment format is selected from a group of data file formats consisting of: pdf-compatible.

26. The method of claim 22 wherein the third-party advertisement server comprises a third-party search engine.

27. The method of claim 22 wherein the advertisement data are topically related to a topic associated with the one or more key words.

28. A computer system comprises:
a memory configured to store a facsimile transmission from a user, wherein the facsimile transmission includes a digitized representation of a document transmitted using a facsimile transmission format; and
a processor coupled to the memory, wherein the processor is configured to process the digitized representation of the document to determine at least one destination e-mail address, wherein the processor is configured to reformat at least a portion of the digitized representation of the document into an e-mail attachment format, wherein the processor is configured to determine advertisement data associated with the facsimile transmission, and wherein the processor is configure to form an e-mail message addressed to the destination e-mail address;
wherein the e-mail message includes a body portion and an attachment portion, wherein the body portion includes the advertisement data, and wherein the attachment portion includes the portion of the digitized representation of the document in the e-mail attachment format;
wherein the processor is configured to process at least a portion of the digitized representation of the document with an optical character recognition engine to determine one or more key words;
wherein the processor is configured to provide the one or more key words to an advertisement server;
wherein the processor is configured to receive the advertisement data from the advertisement server;
wherein the processor is also configured to determine a tracking number associated with the facsimile transmission;
wherein the processor is also configured to maintain processing status associated with the facsimile transmission;
wherein the processor is also configured to maintain an association between the tracking number and the processing status;
wherein the processor is configured to receive the tracking number from a user via a web page; and
wherein the processor is configured to provide the processing status to the user in response to the tracking number.

29. The computer system of claim 28 wherein the advertisement data associated with the facsimile transmission comprises determining at least an area code associated with a facsimile transmission device providing the facsimile transmission.

30. The computer system of claim 28 wherein the advertisement data includes one or more advertisements selected from a group consisting of: hyperlink, listing of at least one auction, search results.

31. The computer system of claim 28 wherein the advertisement server comprises a third-party server.

32. The computer system of claim 31 wherein the third-party server is selected from a group consisting of: Google server, Yahoo! server, e-Bay server, Microsoft Network server, A9 server, Lycos server, Ask Jeeves server, AOL server.

33. The computer system of claim 28 wherein the e-mail attachment format is selected from a group of data file formats consisting of: pdf-compatible.

34. The computer system of claim 31 wherein the third-party server comprises a third-party search engine.

35. The computer system of claim 28
wherein the processor is also configured to process a first portion of the digitized representation of the document with an optical character recognition engine to determine a first candidate e-mail address;
wherein the processor is configured to process a second portion of the digitized representation of the document with the optical character recognition engine to determine a second candidate e-mail address; and
wherein the processor is configured to determine the destination e-mail address in response to the first candidate e-mail address and to the second candidate e-mail address.

* * * * *